(12) United States Patent
Borrey et al.

(10) Patent No.: US 9,129,210 B2
(45) Date of Patent: *Sep. 8, 2015

(54) SYSTEMS AND METHODS OF PROCESSING SCANNED DATA

(71) Applicant: Kofax, Inc., Irvine, CA (US)

(72) Inventors: Roland G. Borrey, Villa Park, CA (US); Mauritius A. R. Schmidtler, Escondido, CA (US); Robert A. Taylor, Yorba Linda, CA (US); Joel S. Fechter, Huntington Beach, CA (US); Hari S. Asuri, Irvine, CA (US)

(73) Assignee: Kofax, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/266,671

(22) Filed: Apr. 30, 2014

(65) Prior Publication Data

US 2014/0233068 A1 Aug. 21, 2014

Related U.S. Application Data

(63) Continuation of application No. 11/329,999, filed on Jan. 11, 2006, now Pat. No. 8,749,839.

(60) Provisional application No. 60/665,067, filed on Mar. 24, 2005.

(51) Int. Cl.
*H04N 1/00* (2006.01)
*G06K 15/00* (2006.01)
(Continued)

(52) U.S. Cl.
CPC ............ *G06K 15/407* (2013.01); *G06K 9/3208* (2013.01); *G06T 5/00* (2013.01); *H04N 1/40* (2013.01)

(58) Field of Classification Search
None
See application file for complete search history.

(56) References Cited

U.S. PATENT DOCUMENTS

| 4,836,026 A | 6/1989 | P'an et al. |
| 4,903,312 A | 2/1990 | Sato |

(Continued)

FOREIGN PATENT DOCUMENTS

| EP | 0767578 | 4/1997 |
| EP | 0936804 | 8/1999 |

(Continued)

OTHER PUBLICATIONS

European Office Communication from European Application No. 06721118.5, dated Jul. 22, 2009.

(Continued)

*Primary Examiner* — Dov Popovici

(74) *Attorney, Agent, or Firm* — Zilka-Kotab, PC

(57) ABSTRACT

An efficient method and system to enhance digital acquisition devices for analog data is presented. The enhancements are available to the user in local as well as in remote deployments yielding efficiency gains for a large variety of business processes. The quality enhancements of the acquired digital data are achieved efficiently by employing virtual reacquisition, which renders unnecessary the physical reacquisition of the analog data in case the digital data by the acquisition are of insufficient quality. The method and system allows multiple users to access the same acquisition device for analog data. One or more users can virtually reacquire data provided by multiple analog or digital sources. The acquired raw data can be processed by each user according to his personal preferences and/or requirements.

31 Claims, 11 Drawing Sheets

(51) Int. Cl.
*G06K 9/32* (2006.01)
*H04N 1/40* (2006.01)
*G06T 5/00* (2006.01)
*G06F 3/12* (2006.01)

(56) References Cited

U.S. PATENT DOCUMENTS

| | | |
|---|---|---|
| 4,992,863 A | 2/1991 | Moriya |
| 5,124,810 A | 6/1992 | Seto |
| 5,151,260 A | 9/1992 | Contursi et al. |
| 5,202,934 A | 4/1993 | Miyakawa et al. |
| 5,282,055 A | 1/1994 | Suzuki |
| 5,317,646 A | 5/1994 | Sang, Jr. et al. |
| 5,375,197 A | 12/1994 | Kang |
| 5,563,723 A | 10/1996 | Beaulieu et al. |
| 5,652,663 A | 7/1997 | Zelten |
| 5,668,890 A | 9/1997 | Winkelman |
| 5,717,794 A | 2/1998 | Koga et al. |
| 5,822,454 A | 10/1998 | Rangarajan |
| 5,867,264 A | 2/1999 | Hinnrichs |
| 5,937,084 A | 8/1999 | Crabtree et al. |
| 6,005,958 A | 12/1999 | Farmer et al. |
| 6,009,196 A | 12/1999 | Mahoney |
| 6,055,968 A | 5/2000 | Sasaki et al. |
| 6,067,385 A | 5/2000 | Cullen et al. |
| 6,072,916 A | 6/2000 | Suzuki |
| 6,154,217 A | 11/2000 | Aldrich |
| 6,219,158 B1 | 4/2001 | Dawe |
| 6,229,625 B1 | 5/2001 | Nakatsuka |
| 6,233,059 B1 | 5/2001 | Kodaira et al. |
| 6,347,152 B1 | 2/2002 | Shinagawa et al. |
| 6,347,162 B1 | 2/2002 | Suzuki |
| 6,370,277 B1 | 4/2002 | Borrey et al. |
| 6,385,346 B1 | 5/2002 | Gillihan et al. |
| 6,396,599 B1 | 5/2002 | Patton et al. |
| 6,408,094 B1 | 6/2002 | Mirzaoff et al. |
| 6,469,801 B1 | 10/2002 | Telle |
| 6,473,198 B1 | 10/2002 | Matama |
| 6,473,535 B1 | 10/2002 | Takaoka |
| 6,480,304 B1 | 11/2002 | Os et al. |
| 6,522,791 B2 | 2/2003 | Nagarajan |
| 6,525,840 B1 | 2/2003 | Haraguchi et al. |
| 6,563,531 B1 | 5/2003 | Matama |
| 6,628,416 B1 | 9/2003 | Hsu et al. |
| 6,665,425 B1 | 12/2003 | Sampath et al. |
| 6,748,109 B1 | 6/2004 | Yamaguchi |
| 6,751,349 B2 | 6/2004 | Matama |
| 6,757,081 B1 | 6/2004 | Fan et al. |
| 6,763,515 B1 | 7/2004 | Vazquez et al. |
| 6,781,375 B2 | 8/2004 | Miyazaki et al. |
| 6,801,658 B2 | 10/2004 | Morita et al. |
| 6,850,653 B2 | 2/2005 | Abe |
| 6,901,170 B1 | 5/2005 | Terada et al. |
| 6,989,914 B2 | 1/2006 | Iwaki |
| 7,027,181 B2 | 4/2006 | Takamori |
| 7,038,713 B1 | 5/2006 | Matama |
| 7,042,603 B2 | 5/2006 | Masao et al. |
| 7,043,080 B1 | 5/2006 | Dolan |
| 7,123,387 B2 | 10/2006 | Cheng et al. |
| 7,168,614 B2 | 1/2007 | Kotovich et al. |
| 7,173,732 B2 | 2/2007 | Matama |
| 7,209,599 B2 | 4/2007 | Simske et al. |
| 7,249,717 B2 | 7/2007 | Kotovich et al. |
| 7,263,221 B1 | 8/2007 | Moriwaki |
| 7,403,313 B2 | 7/2008 | Kuo |
| 7,406,183 B2 | 7/2008 | Emerson et al. |
| 7,430,059 B2 | 9/2008 | Rodrigues et al. |
| 7,430,066 B2 | 9/2008 | Hsu et al. |
| 7,430,310 B2 | 9/2008 | Kotovich et al. |
| 7,447,377 B2 | 11/2008 | Takahira |
| 7,487,438 B1 | 2/2009 | Withers |
| 7,515,313 B2 | 4/2009 | Cheng |
| 7,515,772 B2 | 4/2009 | Li et al. |
| 7,545,529 B2 | 6/2009 | Borrey et al. |
| 7,782,384 B2 | 8/2010 | Kelly |
| 8,749,839 B2 * | 6/2014 | Borrey et al. ............ 358/1.6 |
| 8,823,991 B2 | 9/2014 | Borrey et al. |
| 2002/0030831 A1 | 3/2002 | Kinjo |
| 2002/0054693 A1 | 5/2002 | Elmenhurst |
| 2002/0126313 A1 | 9/2002 | Namizuka |
| 2003/0026479 A1 | 2/2003 | Thomas et al. |
| 2003/0142328 A1 | 7/2003 | McDaniel et al. |
| 2004/0102989 A1 | 5/2004 | Jang et al. |
| 2004/0169873 A1 | 9/2004 | Nagarajan |
| 2004/0169889 A1 | 9/2004 | Sawada |
| 2004/0190019 A1 | 9/2004 | Li et al. |
| 2004/0263639 A1 | 12/2004 | Sadovsky et al. |
| 2005/0046887 A1 | 3/2005 | Shibata et al. |
| 2005/0054342 A1 | 3/2005 | Otsuka |
| 2005/0063585 A1 | 3/2005 | Matsuura |
| 2005/0141777 A1 | 6/2005 | Kuwata |
| 2005/0151990 A1 | 7/2005 | Ishikawa et al. |
| 2005/0271265 A1 | 12/2005 | Wang et al. |
| 2006/0215231 A1 | 9/2006 | Borrey et al. |
| 2006/0268356 A1 | 11/2006 | Shih et al. |
| 2006/0268369 A1 | 11/2006 | Kuo |
| 2007/0002348 A1 | 1/2007 | Hagiwara |
| 2007/0030540 A1 | 2/2007 | Cheng et al. |
| 2013/0251280 A1 | 9/2013 | Borrey et al. |

FOREIGN PATENT DOCUMENTS

| | | |
|---|---|---|
| EP | 1317133 | 6/2003 |
| WO | 2006104627 | 10/2006 |

OTHER PUBLICATIONS

Examiner's Answer to Appeal Brief from U.S. Appl. No. 11/329,999, dated Jan. 6, 2011.

Examiner's Answer to Appeal Brief from U.S. Appl. No. 11/329,999, dated Oct. 17, 2013.

Final Office Action from U.S. Appl. No. 11/329,999, dated Jun. 21, 2010.

Final Office Action from U.S. Appl. No. 13/898,407, dated Jan. 13, 2014.

International Preliminary Exam Report from PCT Application No. PCT/US06/07150, dated Feb. 4, 2011.

International Preliminary Exam Report from PCT Application No. PCT/US2006/07281, dated Dec. 3, 2007.

International Search Report and Written Opinion from PCT Application No. PCT/US2006/07281, dated Jun. 30, 2006.

International Search Report and Written Opinion from PCT Application No. PCT/US2006/007150, dated Jul. 4, 2006.

Non-Final Office Action from U.S. Appl. No. 11/329,753, dated Nov. 5, 2008.

Non-Final Office Action from U.S. Appl. No. 11/329,753, dated Apr. 30, 2008.

Non-Final Office Action from U.S. Appl. No. 11/329,753, dated Sep. 12, 2007.

Non-Final Office Action from U.S. Appl. No. 11/329,999, dated Feb. 3, 2010.

Non-Final Office Action from U.S. Appl. No. 11/329,999, dated Jul. 20, 2009.

Non-Final Office Action from U.S. Appl. No. 11/329,999, dated Oct. 27, 2009.

Non-Final Office Action from U.S. Appl. No. 13/898,407, dated Aug. 1, 2013.

Notice of Allowance from Japanese Application No. 2008-503002, dated Apr. 24, 2012.

Notice of Allowance from U.S. Appl. No. 11/329,753, dated Mar. 13, 2009.

Notice of Allowance from U.S. Appl. No. 11/329,999, dated Jan. 31, 2014.

Notice of Allowance from U.S. Appl. No. 13/898,407, dated Apr. 23, 2014.

Notice of Final Rejection Translation from Japanese Application No. 2008-503002, dated Dec. 27, 2011.

(56) References Cited

OTHER PUBLICATIONS

Notice of Reasons for Rejection Translation from Japanese Application No. 2008-503002, dated Oct. 21, 2009.
Notice of Reasons for Rejection Translation from Japanese Application No. 2008-503002, dated Sep. 30, 2010.
Replacement Examiner's Answer to Appeal Brief from U.S. Appl. No. 11/329,999, dated Jan. 31, 2011.
Shustorovich et al., "A Subspace Projection Approach to Feature Extraction: The Two-Dimensional Gabor Transform for Character Recognition," Neural Networks, vol. 7, Issue 8, 1994, pp. 1295-1301, Abstract Only.
Shustorovich et al., "Neural Network Positioning and Classification of Handwritten Characters," Neural Networks, vol. 9, Issue 4, Jun. 1996, pp. 685-693, Abstract Only.

* cited by examiner

SYSTEMS AND METHODS OF PROCESSING SCANNED DATA

The present application is a continuation of U.S. application Ser. No. 11/329,999, filed Jan. 11, 2006, which claims priority benefit under 35 U.S.C. §119(e) from U.S. Provisional Application No. 60/665,067, filed Mar. 24, 2005, titled SYSTEMS AND METHODS FOR ENHANCING DIGITAL ACQUISITION DEVICES FOR ANALOG DATA IN LOCAL AS WELL AS REMOTE DEPLOYMENTS, from all of which priority is claimed and which are all hereby incorporated herein by reference.

BACKGROUND OF THE INVENTION

1. Field of the Invention

The present invention relates to systems and methods for improving the quality of data acquired by data acquisition devices. The user can be located locally or remotely from the data acquisition device.

2. Description of the Related Art

Data acquisition devices for analog data transform analog data to digital data. A typical example is a scanning device. It takes as input an image printed onto a sheet of paper and outputs a digital representation of the physical image. The quality obtained by the acquisition device depends strongly on using the device with settings that are suited for the specifics of the given analog data. For example, the scanner settings useful to achieve a high quality scanned image of a sunset are rather different from the settings used to scan a picture taken in the broad sunlight of a summer day. Finding better or optimal settings given the specifics of the analog data is a time consuming process that often makes it necessary to acquire the analog data more than once using different settings of the acquisition device. This becomes particularly unpractical and inefficient when the recipient of the digital data and the data acquisition device are at different locations.

The following example illustrates the inefficiency of the current technology. The recipient of a fax is unsatisfied with the quality of the received fax. In order to obtain a better quality fax, the recipient has to, e.g. by using a phone, inform a person located at the origination of the fax and request to resend the fax with different settings.

Furthermore, given temporary analog data, the determination of improved acquisition settings using physical reacquisition of the analog data is either impossible or less feasible within a narrow time frame.

In current remote data acquisition applications, analog data are acquired digitally by using, for example, a scanning device or a digital copy machine. The digitalized data are then sent to a remote recipient via a network. Current methods of remote digital acquisition application do not provide the remote recipient of the acquired data with remote control of the data acquisition device.

SUMMARY OF THE INVENTION

Embodiments include methods of virtual reacquisition of data for the purpose of quality enhancements. In an embodiment, virtual reacquisition for quality enhancement may be used for scanning devices, and other data acquisition devices, such as, for example, digital copiers, fax machines, multi-functional peripherals, infrared cameras, acoustic cameras, digital cameras, infrared cameras, acoustic cameras, digital cameras, mobile phones with built in digital cameras, and the like. Virtual reacquisition can be used with any analog or digital source including, for example, voice, acoustic measurements for monitoring devices, temperature, video, and the like.

The input stream of an acquisition device for analog data can be either discrete or continuous. In addition, the input stream can be a function of time or space. Regardless of these modalities, the resulting data are contained in an ordered set of discrete units. The order of the set contains the information of the time or space direction of the input stream. In case of a continuous input stream, the acquisition device generates discrete units by subdividing the continuous input stream in bins. For example, the input to a video camera is continuous, and the resulting data are given by the ordered set of picture frames taken by the camera with each picture frame being an instance of the aforementioned discrete units. A batch of paper sheets fed into a scanning device is an example of a discrete input stream, and the discrete data are defined by the paper sheets.

One embodiment is an efficient method and system for enhancing the digital data obtained by an acquisition device for analog data. The enhancements are obtained using virtual reacquisition of the analog data. The method of virtual reacquisition stores the raw data acquired by the acquisition device in a cache. The data processor accesses the raw data from the cache allowing the reprocessing of the raw data by the data processor without physically reacquiring the data by the acquisition device.

An embodiment stores as many of the incoming data units at the cache as possible, given the cache size. In certain embodiments, new storage for incoming data is created by deleting the data units that have resided at the cache the longest. In addition, or in other embodiments, data units are assigned priorities and data units with lower priorities are overwritten with new data units before data units with higher priorities.

An embodiment has the capability of virtually reacquiring the most current or more currently used data units acquired by the acquisition device. Alternatively, the user can, via a selection mechanism, virtually reacquire the raw data or subsections of the raw data stored at the cache. The method of virtual reacquisition renders unnecessary the time and labor consuming physical reacquisition of the analog data. Furthermore, in instances where physical reacquisition of the data is impossible, e.g. in the case of a time dependant input stream, the application of virtual reacquisition is especially valuable.

An additional application of virtual reacquisition is given when the acquisition rate of the acquisition device is too high for the output communication system and as default, compressed low resolution data are transferred. Using virtual reacquisition the recipient of the data can selectively access and reprocess the original high-resolution data despite the constraint given by the bandwidth of the transmission.

In addition, an embodiment of the method and system presented here utilizes virtual reacquisition to efficiently determine improved or optimal acquisition device settings. The improved or optimal settings can be found interactively in real time as well as in non-real time, automatically by the system itself, or using a combination thereof, depending on the specific embodiment. Furthermore, the method and system facilitates the control of digital acquisition devices by alerting the user automatically about potentially low quality digital data or changes in the input stream, that might be of interest to the user, by analyzing the data and comparing the results against some user defined thresholds. This feature is of value, for example, in deployments using or requiring the acquisition of large amounts of analog data.

In addition, the method of virtual reacquisition in combination with remote deployment, as presented in an embodiment, offers the potential of large efficiency gains in a large variety of business processes, e.g. security surveillance applications. For example, a building is monitored using a video system and, owing to the available bandwidth, as low resolution data are transmitted to a central location. By analyzing the data, the system detects events that are potentially of interest for the person monitoring the system and triggers the transmission of high-resolution data to the user utilizing virtual reacquisition.

By transferring as default the processed data instead of the raw uncompressed data, the remote application of an embodiment makes efficient use of storage and of the network reducing or minimizing the hardware usage or requirements on storage as well as the network.

Furthermore, an embodiment of the method and system presented here allows multiple users to share the usage of one or multiple analog acquisition devices. Each user can process the same raw data with different setting of the data processor enabling each individual user to process the raw data according to his or her personal preferences and needs.

Finally, an embodiment of the method and system can be independently applied to subsections of the acquired discrete data units, i.e. the user can select subsections of the acquired data unit and process the selected subsections differently. For example, given a scanned image displaying an image and text, the user can subdivide the acquired data unit in two zones with one containing the image and the other text and can virtual reacquire the zones using settings most suited or better suited for the selected zone.

As mentioned above, an embodiment of the method and system presented here has the capability of determining improved or optimal processor settings automatically by deploying potentially one or more analytic engines. For example, a first analytic engine (engine 1) takes as input the raw data, whereas a second analytic engine (engine 2) uses the processed data as input. The second engine determines the quality of the processed data using a metric. It selects new processor settings either randomly or depending on the quality of the processed data as determined by the metric. The raw data are reprocessed using the new settings. This process continues until convergence, i.e. until the metric cannot detect any improvements in the quality of the processed data. The functions performed by the first analytic engine are, but are not limited to, page boundaries detection, background smoothing, bleed-through detection, color detection, and orientation detection, and the like.

Page boundaries detection is useful for efficient page skew correction. In an embodiment, the page boundaries detection detects the page against a variety of backgrounds and, thus, allows page skew correction and cropping for white background scanners as well as black background scanners.

An embodiment of a background smoothing method addresses the need or desire to reduce the number of colors within the backgrounds of an image to improve the appearance of the image as well as decrease the size of the image after compression. An embodiment of the method works as follows. Cluster all or a portion of the colors found in the image and select those that contain enough pixels to be considered backgrounds. These backgrounds are then merged, and all or a portion of the pixels within the image belonging to a background cluster are replaced by the average color within the cluster.

An embodiment of the bleed-through detection detects bleed-through on otherwise blank sides of scanned documents in order to perform further image processing on these pages. An embodiment of this algorithm uses page boundary detection within front and back scanned images to approximately match side coordinates. Then, the algorithm uses existing color or gray content to fine-tune the mapping. This additional step is useful because of slightly different optics and skews of front and back cameras. If residual (unexplained) content fall below certain density criterion, the page is called blank.

In an embodiment, the color detection addresses the need or desire to detect the color content in a scanned image and the need or desire to distinguish between the foreground and background color. An embodiment of this algorithm provides a mechanism to eliminate the background color if it is a predominant color or the most predominant color in the document. An embodiment of this algorithm examines pixels in the scanned image and determines if they are a color pixel or a background pixel. This determination uses the saturation and luminance levels of the pixel.

In an embodiment, orientation detections determine automatically which way to orthogonally rotate a text page for viewing. An embodiment of the algorithm selects possible individual characters from connected components of black within the page and determines their individual orientations by a trained neural network. The algorithm uses the orientation results as votes to decide which orientation of the page is best or an improvement.

In an embodiment, virtual reacquisition is implemented as software and is independent from the acquisition device. The users of the acquisition device can interactively enhance the quality of the digital representation of the acquired analog data by changing the processor settings. The possible adjustments include, but are not limited to, brightness, contrast, gamma, erosion, orientation, segmentation, color rendering, saturation, resolution, warping angle, out of sequence detection, dilation, speckle removal, and skew angle. The embodiment is of value, for example, in connection with acquisition devices that, owing to their limited hardware capabilities, are generally incapable of producing consistently high quality digital data given, as input, a large variety of analog data. In these instances, the embodiment is a cost effective method to enhance the capabilities and usability of the acquisition device.

Furthermore, an embodiment allows the users of the acquisition device to acquire the digital data according to their individual preferences and requirements.

Another advantage, in an embodiment, is virtual reacquisition's independence from the acquisition device. The algorithms employed by virtual reacquisition typically progress on a considerably faster pace than the improvements to the hardware of the acquisition devices. The user can easily take advantage of the algorithmic improvements by simply updating the virtual reacquisition software. This feature is of value, for example, for expensive high-end scanners by reducing or minimizing the scanners depreciation.

In a further embodiment, the embodiments described above are deployed remotely and, thus, offers the capabilities of virtual reacquisition to one or more remote recipients of the digital data. The implementation may be software, firmware, hardware, or any combination of software, firmware, or hardware.

An example of an embodiment is within the usage of fax server machines. The data are rendered in high definition analog form, stored at the data cache of the fax communication server, and the binary data, obtained by using default settings and attributes, are sent to their respective destinations. Through a call back protocol, implemented at the fax server machine, the recipient of the fax can select a specific image or a scaled area of an image from the images stored at the fax server and specify the processor settings and attributes for the selected image. The selected image or scaled area of the image is reprocessed according to the specified settings and transmitted to the recipient.

Image sets are stored in the cache at the fax server. When the cache is full or when the image is fully processed by the user, the images are either erased, replaced by the transmitted image, stored in a database, or any combination thereof. This embodiment enables the recipient of the fax to enhance the quality of the received fax directly on his desktop or application, rendering obsolete the resending of the fax in case of insufficient image quality.

In addition, the above-mentioned call back protocol allows the recipient to alert the sender to irreversible potential problems such as, white pages. Finally, the sender does not have to guess improved or optimal settings while sending the fax.

In a further embodiment, virtual reacquisition is enhanced by an analytic engine that takes as input the raw data of the acquisition device. The analytic engine automatically determines improved or close to optimal settings for the acquisition device. Additionally, it automatically monitors the quality of the digital data obtained by the acquisition device and alerts the user when the quality is below a predetermined threshold. The user can adjust the threshold to his or her preferences. In addition, the user can overwrite the acquisition device settings determined by the analytic engine and interactively adjust the settings manually when necessary or desired.

In an embodiment, the interactive adjustments can be done in non real-time, and thus, do not interrupt the flow of incoming data. This embodiment is of interest, for example, for deployments that use or require the acquisition of large amounts of analog data. It allows a nearly automatic data acquisition and still ensures high quality of the resulting digital data. Typical examples are copier rooms or facilities that electronically archive large amounts of paper documents using scanning devices.

In an embodiment, virtual reacquisition enhanced by an analytic engine may be implemented as software, firmware, hardware, or any combination of software, firmware, or hardware. The hardware implementation offers advantages with regard to speed compared to the software implementation and allows handling high volumes of data fast and efficient.

In a further embodiment, the virtual reacquisition enhanced by the analytic engine is deployed remotely. Remotely deployed virtual reacquisition enhanced by an analytic engine may be implemented as software, firmware, hardware, or any combination of software, firmware, or hardware.

In a further embodiment, the virtual reacquisition is enhanced by a first and a second analytic engine. The second analytic engine analyzes the processed digital data obtained with specific data processor settings from the first analytic engine. Utilizing this information, the second analytic engine estimates a new set of data processor settings and the raw data are virtually reacquired using the new settings.

In an embodiment, this process is iterated until sufficiently improved settings or the optimal settings have been determined automatically. Virtual reacquisition enhanced by a first and a second analytic engine may be implemented as software, firmware, hardware, or any combination of software, firmware, or hardware.

In a further embodiment, virtual reacquisition enhanced by a first and a second analytic engine is deployed remotely. Remotely deployed virtual reacquisition enhanced by a first and a second analytic engine may be implemented as software, firmware, hardware, or any combination of software, firmware, or hardware.

In an embodiment, a data processing system comprises raw or normalized data from a data capture device, where the raw or normalized data is stored in a computer accessible storage medium, and a first acquisition controller in communication with the raw or normalized data. The first acquisition controller is configured to analyze at least portions of the raw or normalized data to determine whether the raw or normalized data is within a first set of parameters. If the raw or normalized data is not within the first set of parameters, the first acquisition controller generates a first set of processor settings. The data processing system further comprises a processor in communication with the first acquisition controller, where the processor is configured to process the raw or normalized data with the first set of processor settings, and a second acquisition controller in communication with the processor. The second image acquisition controller is configured to analyze at least portions of the processed data to determine whether the processed data is within a second set of parameters. If the processed data is not within the second set of parameters, the second acquisition controller generates a second set of processor settings that the processor uses to reprocess the raw or normalized data.

In another embodiment, a data processing method comprises storing raw or normalized data from a data capture device in a computer accessible storage medium, and analyzing at least portions of the raw or normalized data with a first analytic engine to determine whether the raw or normalized data is within a first set of parameters. If the raw or normalized data is not within the first set of parameters, the method comprises generating with the first analytic engine a first set of processor settings, processing the raw or normalized data with the first set of processor settings, and analyzing at least portions of the processed data with a second analytic engine to determine whether the processed data is within a second set of parameters. If the processed data is not within the second set of parameters, the method further comprises generating with the second analytic engine a second set of processor settings to reprocess the raw or normalized data.

In yet another embodiment, a data processing system comprises a storing means for storing raw data from a data capture device, a first analyzing means in communication with the raw data for analyzing at least portions of the raw data to determine whether the raw data is within a first set of parameters, and if not, the first analyzing means generates a first set of processor settings. The data processing system further comprises a processing means in communication with the first analyzing means for processing the raw data with the first set of processor settings, and a second analyzing means in communication with the processing means for analyzing at least portions of the processed data to determine whether the processed data is within a second set of parameters, and if not, the second analyzing means generates a second set of processor settings that the processing means uses to reprocess the raw data.

In a further embodiment, a document processing system comprises document data from a data capture device where the document data is stored in a computer accessible storage medium, and a first acquisition controller in communication with the document data. The first acquisition controller is configured to analyze at least portions of the document data to determine whether the document data is within a first set of parameters. If the document data is not with the first set of parameters, the first acquisition controller generates a first set of processor settings. The document processing system further comprises a processor in communication with the first acquisition controller, where the processor is configured to process the document data with the first set of processor settings, and a second acquisition controller in communication with the processor. The second acquisition controller is configured to analyze at least portions of the processed document data to determine whether the processed document data is within a second set of parameters. If the processed document data is not within the second set of parameters, the second acquisition controller generates a second set of processor settings that the processor uses to reprocess the document data.

In an embodiment, a document processing method comprises storing document data from a data capture device in a computer accessible storage medium, and analyzing with a first analytic engine at least portions of the document data to determine whether the document data is within a first set of parameters. If the document data is not within the first set of parameters, the method further comprises generating with the first analytic engine a first set of processor settings, processing the document data with the first set of processor settings, and analyzing with a second analytic engine at least portions of the processed document data to determine whether the processed document data is within a second set of parameters. If the processed document data is not within the second set of parameters, the method further comprises generating with the second analytic engine a second set of processor settings to reprocess the document data.

In another embodiment, a document processing system comprises a storing means for storing document data from a data capture device, a first analyzing means in communication with the document data for analyzing at least portions of the document data to determine whether the document data is within a first set of parameters, and if not, the first analyzing means generates a first set of processor settings. The document processing system further comprises a processing means in communication with the first analyzing means for processing the document data with the first set of processor settings, a second analyzing means in communication with the processing means for analyzing at least portions of the processed document data to determine whether the processed document data is within a second set of parameters, and if not, the second analyzing means generates a second set of processor settings that the processing means uses to reprocess the document data.

In yet another embodiment, a document processing system comprises a random access cache that receives a document from a scanner, where the document is stored as multiple bands within the random access cache and in a manner that is randomly accessible. The document processing system further comprises a processor in communication with the random access cache, where the processor is configured to obtain the document from the random access cache, the processor having processor control settings that are used to process the document, and an acquisition controller interconnected with the processor. The acquisition controller is configured to analyze the processed document to determine when to use different processor control settings on at least one band within the document and where the processor randomly accesses the at least one band stored in the random access cache to reprocess the band with the different processor control settings.

In a further embodiment, a document processing method comprises storing a document from a scanner as multiple bands within a random access cache and in a manner that is randomly accessible, obtaining the document from the random access cache, and processing the document with processor control settings. The method further comprises analyzing the processed document with an analytic engine to determine when to use different processor control settings on at least one band within the document, and randomly accessing the at least one band stored in the random access cache to reprocess the band with the different processor control settings.

In an embodiment, a document processing system comprises a storing means for storing a document received from a scanner as multiple bands within the storing means and in a manner that is randomly accessible, and a processing means for obtaining the document from the storing means and processing the document with processor control settings associated with the processing means. The document processing system further comprises an analyzing means for analyzing the processed document to determine when to use different processor control settings on at least one band within the document, and an accessing means for randomly accessing the at least one band stored in the storing means to reprocess the band with the different processor control settings.

For purposes of summarizing the invention, certain aspects, advantages, and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the first digit of each reference number indicates the figure in which the element first appears.

DETAILED DESCRIPTION OF THE PREFERRED EMBODIMENT

Figure 1:
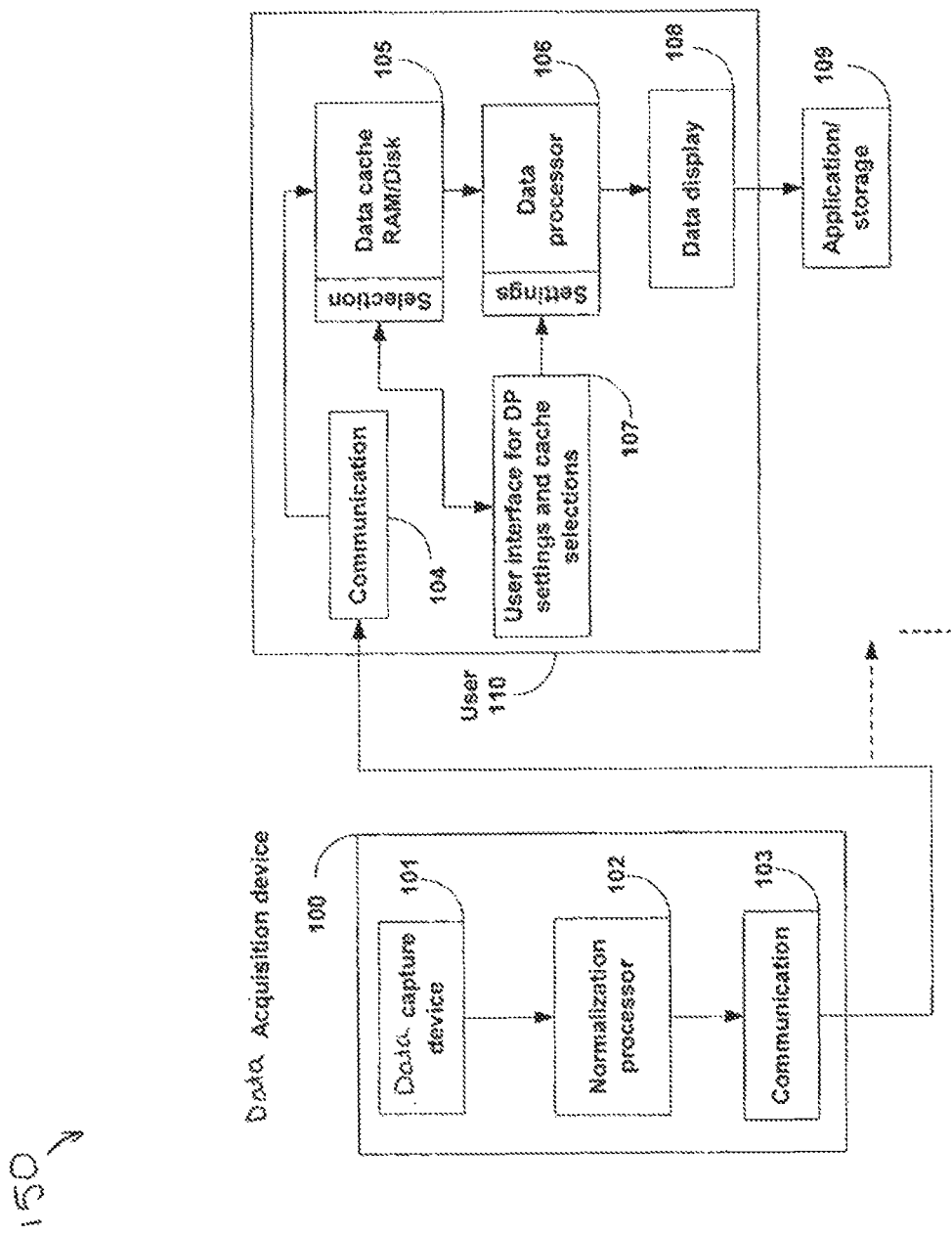
FIG. 1 is a block diagram of an embodiment of a data acquisition and rescanning system.

FIG. 1 is a block diagram of an embodiment of a data acquisition and rescanning system 150. The data acquisition and rescanning system 150 comprises a data acquisition device 100, which comprises a data capture device 101, a normalization processor 102, and a communication device 103. Examples of data capture devices 101 include, but are not limited to scanners, cameras, video recorders, infrared cameras, acoustic cameras, digital cameras, facsimile machines, any devices capable of capturing an image, acoustic sensors, any devices having an acoustic sensor, and the like. Data capture devices 101 can be non-real time devices, such as, for example, scanners, or data capture devices 101 can be real time devices, such as, for example, cameras and video recorders.

The data acquisition and rescanning system 150 further comprises a user system 110, which comprises a communication device 104, which communicates with the communication device 103, a random access data cache 105, a data processor 106, a user interface 107, and a data display 108. In an embodiment, the random access data cache stores the data in at least one subsection, zone, band, image strip, data strip, or the like, and in a manner that is randomly accessible.

The data reacquisition and rescanning system 150 further comprises an application/storage device 109. Examples of the application/storage device 109 include, but are not limited to computer processors, program logic, controller circuitry, general purpose single-chip or multi-chip microprocessors, digital signal processors, embedded microprocessors, microcontrollers and the like. Data storage examples can include volatile and non-volatile memory, hard drives, DVD storage, CD ROM storage, optical and magneto-optical storage, removable or non-removable flash memory devices, or another memory device.

Analog data are presented to the acquisition device 100. The analog capture device 101 measures the analog data. The normalization processor 102 transforms the measured data into normalized data. It calibrates and compensates for known errors and biases introduced by the sensors measuring the analog data to produce normalized data.

The normalized raw data, referred to as raw data from here on, are transmitted via a fast connection using the communication devices 103 and 104 to the user system 110 and stored at the random access data cache 105. The raw data are stored as bands, image strips, data strips, or the like in the random access cache 105. In an embodiment, the random access data cache 105 is partitioned into 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments, tags identify subsections or zones of raw data.

The data processor 106 processes the raw data using the default data processor settings.

The order in which the raw data are processed by the data processor 106 is either determined automatically or interactively. In an automatic embodiment, the most current or more current raw data first stored at the cache 105 are processed.

In an interactive embodiment, the user identifies specific raw data bands or subsections of these for processing utilizing the data tags or metadata. The bands are randomly accessible in the cache 105. This allows non real-time virtual reacquisition.

The processed data together with their metadata are displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the user's preferences.

In addition to controlling the data processor 106, the user interface 107 also controls the random access data cache 105. The user, through the user interface 107, can access subsections, zones, bands, image strips, or data strips of the raw data as well as selecting specific raw data for non real time interactive processing.

The user can transmit the processed data to the application/storage device 109 for further processing as well as storage.

The data acquisition and rescanning system 150 depicted in FIG. 1 supports multiple user usage. The data acquisition device 100 can be accessed by multiple users. In an embodiment, the user system 110 further comprises a computer (not shown). In an embodiment, the user system 110 is implemented, at least in part, as software on the computer.

Figure 2:
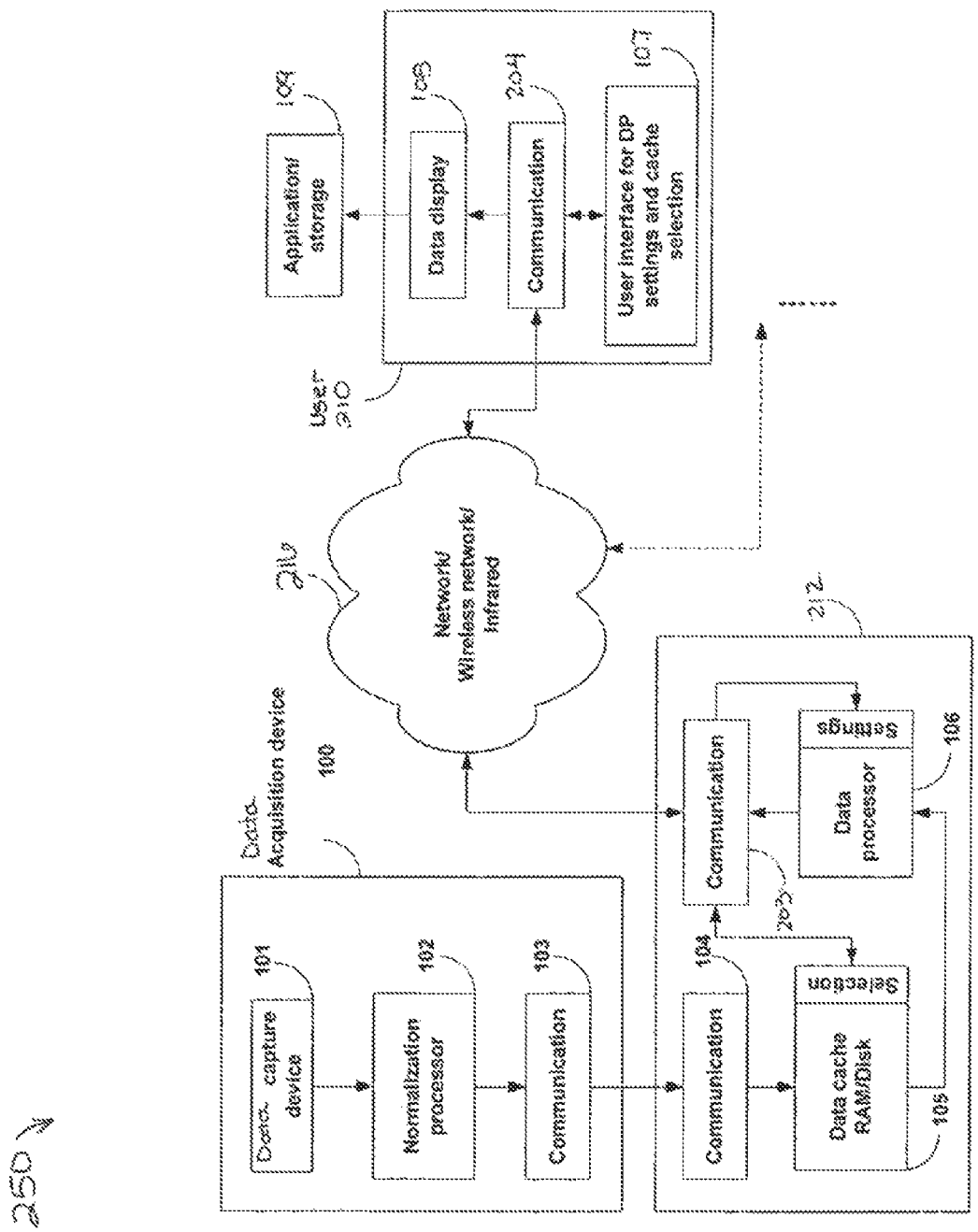
FIG. 2 is a block diagram of an embodiment of a remotely deployed data acquisition and rescanning system.

FIG. 2 is a block diagram of an embodiment of a remotely deployed data acquisition and rescanning system 250. The data acquisition and rescanning system 250 comprises the data acquisition device 100, a storage and processing system 212, a user system 210, and the acquisition/storage device 109.

The storage and processing system 212 comprises the communication device 103, the random access data cache 105, the data processor 106, and a communication device 203.

The user system 210 comprises a communication device 204, the user interface 107, and the data display 108.

The raw data from the acquisition device 100 are transmitted, via a fast connection using the communication devices 103 and 104, to the storage and processing system 212. The raw data and the metadata are stored at the random access data cache 105. The data processor 106 processes the raw data using the default data processor settings.

The user system 210 communicates with the storage and processing system 212 via a communication medium 216 using the communication devices 203 and 204.

Focusing now on the communication medium 216, as shown in FIG. 2, in one embodiment, the communications medium is Internet, which is a global network of computers. In other embodiments, the communication medium 216 can be any communication system including by way of example, dedicated communication lines, telephone networks, wireless data transmission systems, infrared data transmission systems, two-way cable systems, customized computer networks, interactive kiosk networks, and the like.

The processed data together with their metadata are displayed at the data display 108. The default data processor settings are adjustable through the user interface 107. Changing the settings triggers the data processor 106 to reprocess the selected raw data stored in the random access data cache 105 with the changed settings and to display the reprocessed data at the data display 108. By interactively readjusting the processor settings, the data are processed until they satisfy the user's preferences.

The user can transmit the processed data to the application/storage device 109 for further processing as well as storage.

The data acquisition and rescanning system 250 is similar to the data acquisition and rescanning system 150 except the user system 210 is located remotely from the data acquisition device 100 and the storage and processing system 212. In the remotely deployed system 250, the data cache 105 is local to the data acquisition device 100. The user system 210 does not have to be connected to the data acquisition device 100 with a fast connection in order to ensure an effective use of the embodiment. The data acquisition and rescanning system 250 is implemented, at least in part, as software, firmware, or any combination of software and firmware.

Figure 3:
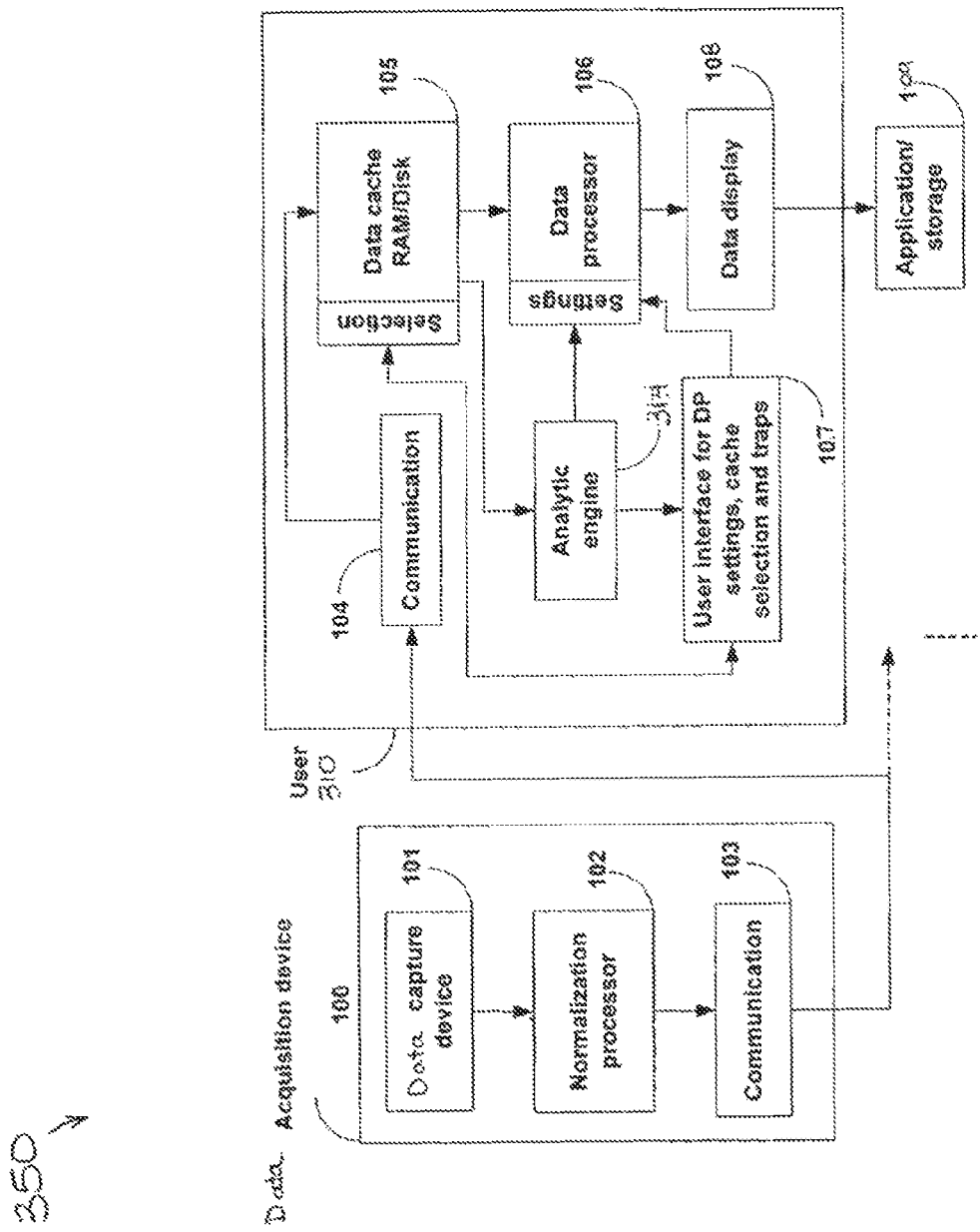
FIG. 3 is a block diagram of an embodiment of a data acquisition and rescanning system having an analytic engine.

FIG. 3 is a block diagram of an embodiment of a data acquisition and rescanning system 350 comprising an analytic engine. The data acquisition and rescanning system 350 comprises the data acquisition device 100, a user system 310, and the application/storage device 109. The user system 310 comprises the communication device 104, the random access data cache 105, the data processor 106, the user interface 107, the data display 108, and an analytic engine 314.

Analog data are presented to the acquisition device 100. The analog capture device 101 measures the analog data. The normalization processor 102 transforms the measured data into normalized raw data. The raw data are transmitted via a fast connection using the communication devices 103 and 104 to the user system 310. At the user system 310, the raw data are stored at the random access data cache 105.

Selected raw data are analyzed by the analytic engine 314. In an embodiment, the analytic engine 314 is an acquisition controller 314. The selection mechanism can be either automatic or interactive as described in the embodiments above. The analysis performed by the analytic engine 314 yields new data processor settings for the selected raw data. Examples of analyses comprise, but are not limited to, page boundary detection, streak detection, page border detection, blank page detection, conversion from RGB color representation to a YCbCr color representation, hue measurement, saturation measurement, luminescence measurement, creating a grayscale intensity histogram, creating a color histogram, geometric analysis, color detection, gamma detection for brightness and color levels, textual orientation, and the like.

The settings are transferred to the data processor 106, and the raw data are processed with the new settings. The processed data are displayed at the data display 108. The data processor settings can be adjusted interactively using the user interface 107. In addition to determining the data processor settings, the analytic engine 314 also detects automatically raw data that will potentially result in poor quality processed data and alerts the user upon selection of these data through the user system 310. The corresponding trapping conditions (e.g., user-defined parameters specifying quality thresholds such as brightness range, contrast range, missing corner, blank page, and the like) are accessible to the user through the user interface 107. The user through the user system 310 is able to control the quality of the acquired data.

The user system 310 can transmit the processed data to the application/storage device 109 for further processing as well as storage. Additionally the user can, via the user interface 107, access subsections, or zones of the raw data stored at the random access data cache 105 to be processed at the data processor 106.

The data acquisition and rescanning system 350 allows the non real time interactive processing of specific raw data. The data acquisition and rescanning system 350 also supports multiple user usage. The data acquisition device 100 can be accessed by multiple user systems 310 with each data processor 106 having unique processor settings. In an embodiment, the data acquisition and rescanning system 350 further comprises a computer (not shown). In an embodiment, the data acquisition and rescanning system 350 is implemented, at least in part, as software on the computer.

Figure 4:
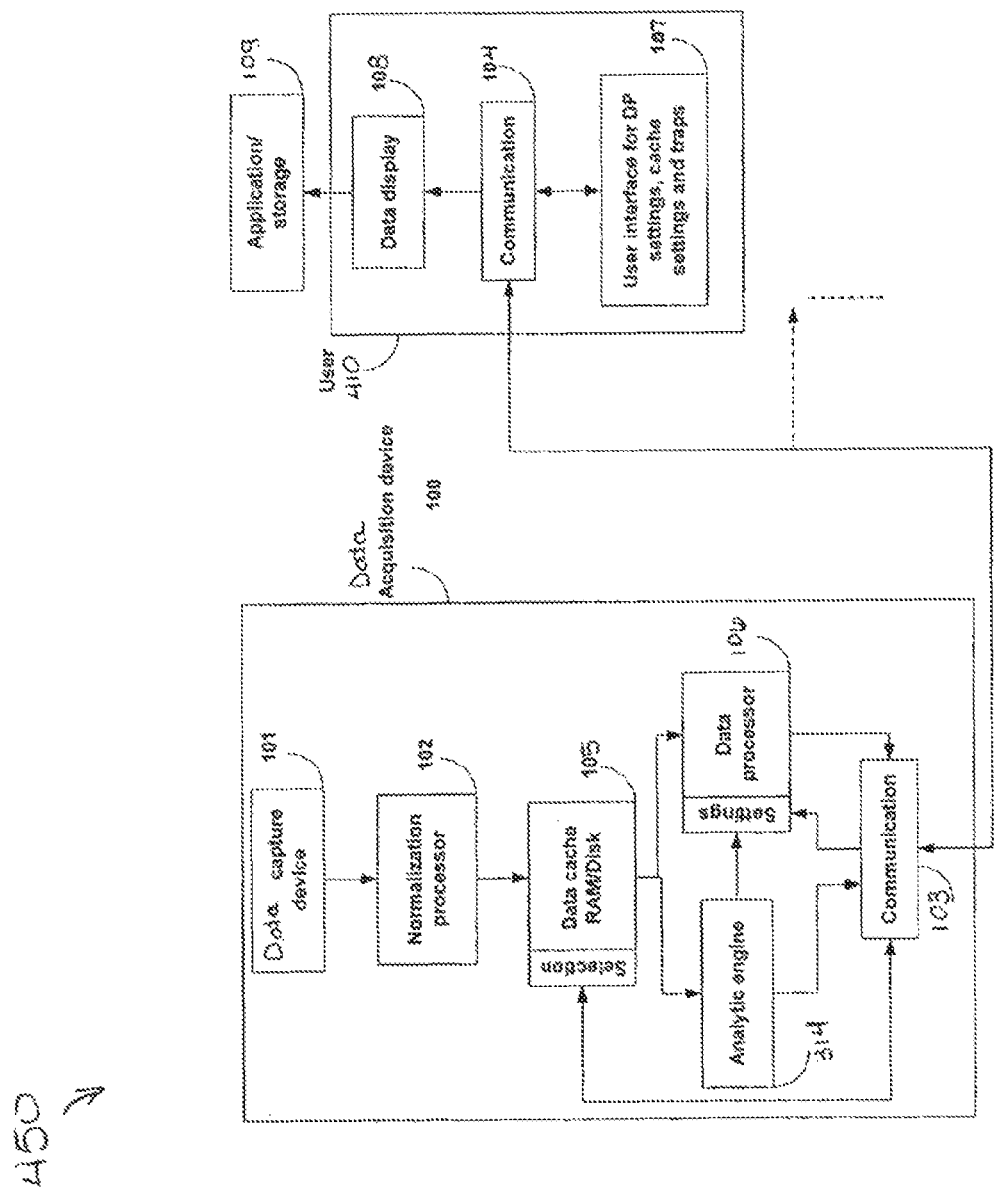
FIG. 4 is a block diagram of a hardware-implemented embodiment of a data acquisition and rescanning system having an analytic engine.

FIG. 4 is a block diagram of an embodiment of a data acquisition and rescanning system 450 comprising the data acquisition device 100, a user system 410, and the analytic engine 314. The data acquisition and rescanning system 450 implements the data acquisition and rescanning system 350 shown in FIG. 3 as hardware.

The random access data cache 105, the data processor 106, and the analytic engine 314 are implemented at the data acquisition device 100. The data acquisition device 100 further comprises the data capture device 101, the normalization processor 102, and the communication device 103. The user system 410 comprises the communication device 104, the user interface 107, and the data display 108.

Figure 5:
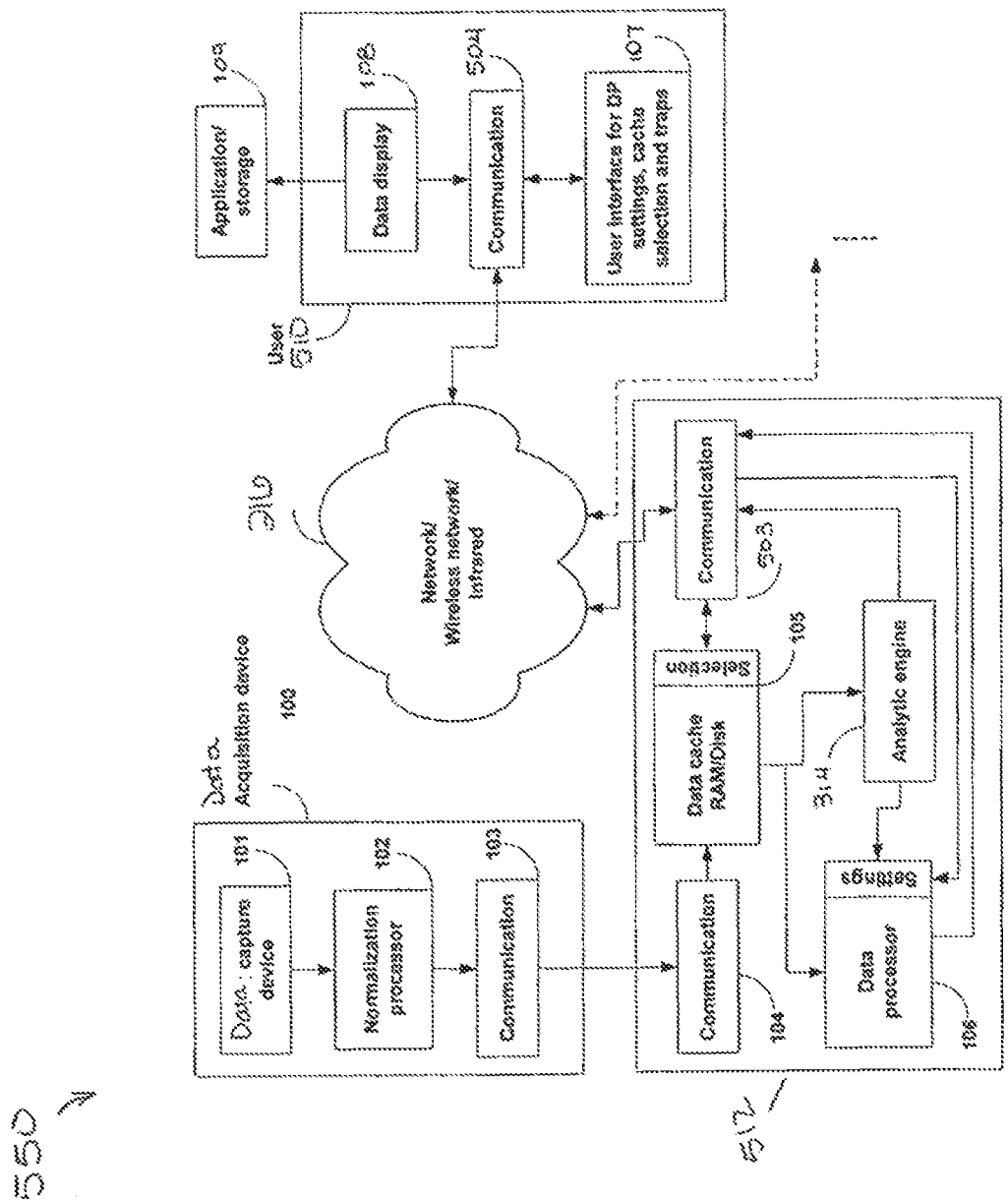
FIG. 5 is a block diagram of an embodiment of a remotely deployed data acquisition and rescanning system having an analytic engine.

FIG. 5 is a block diagram of an embodiment of a remotely deployed data acquisition and rescanning system 550 comprising the analytic engine 314. The data acquisition and rescanning system 550 comprises the data acquisition device 100, a storage and processing system 512, a user system 510, and the acquisition/storage device 109.

The storage and processing system 512 comprises the communication device 104, the random access data cache 105, the data processor 106, the analytic engine 314, and a communication device 503.

The user system 510 comprises a communication device 504, the user interface 107, and the data display 108.

The raw data from the acquisition device 100 are transmitted, via a fast connection using the communication devices 103 and 104, to the storage and processing system 512. The raw data and the metadata are stored at the cache 105. The data processor 106 processes the raw data using the default data processor settings.

Selected raw data are analyzed by the analytic engine 314. The analysis performed by the analytic engine 314 yields new data processor settings for the selected raw data. The settings are transferred to the data processor 106, and the raw data are processed with the new settings.

The user system 510 communicates with the storage and processing system 512 via the communication medium 216 using the communication devices 503 and 504. The processed data are displayed at the data display 108. The data processor settings can be adjusted interactively using the user interface 107.

The user, through the user system 510, can transmit the processed data to the application/storage device 109 for further processing as well as storage. Additionally the user can, via the user interface 107, access subsections, or zones of the raw data stored at the random access data cache 105 to be processed at the data processor 106.

The data acquisition and rescanning system 550 allows the non real time interactive processing of specific raw data. The data acquisition and rescanning system 550 is similar to the data acquisition and rescanning system 350 except the user system 510 is located remotely from the data acquisition device 100 and the storage and processing system 512. In the remotely deployed system 550, the data cache 105 and the analytic engine 314 are local to the data acquisition device 100.

The data acquisition and rescanning system 550 also supports multiple user usage. The data acquisition device 100 can be accessed by multiple user systems 510 with each data processor 106 having unique processor settings. The data acquisition and rescanning system 550 is implemented, at least in part, as software, firmware, or a combination of software and firmware.

Figure 6:
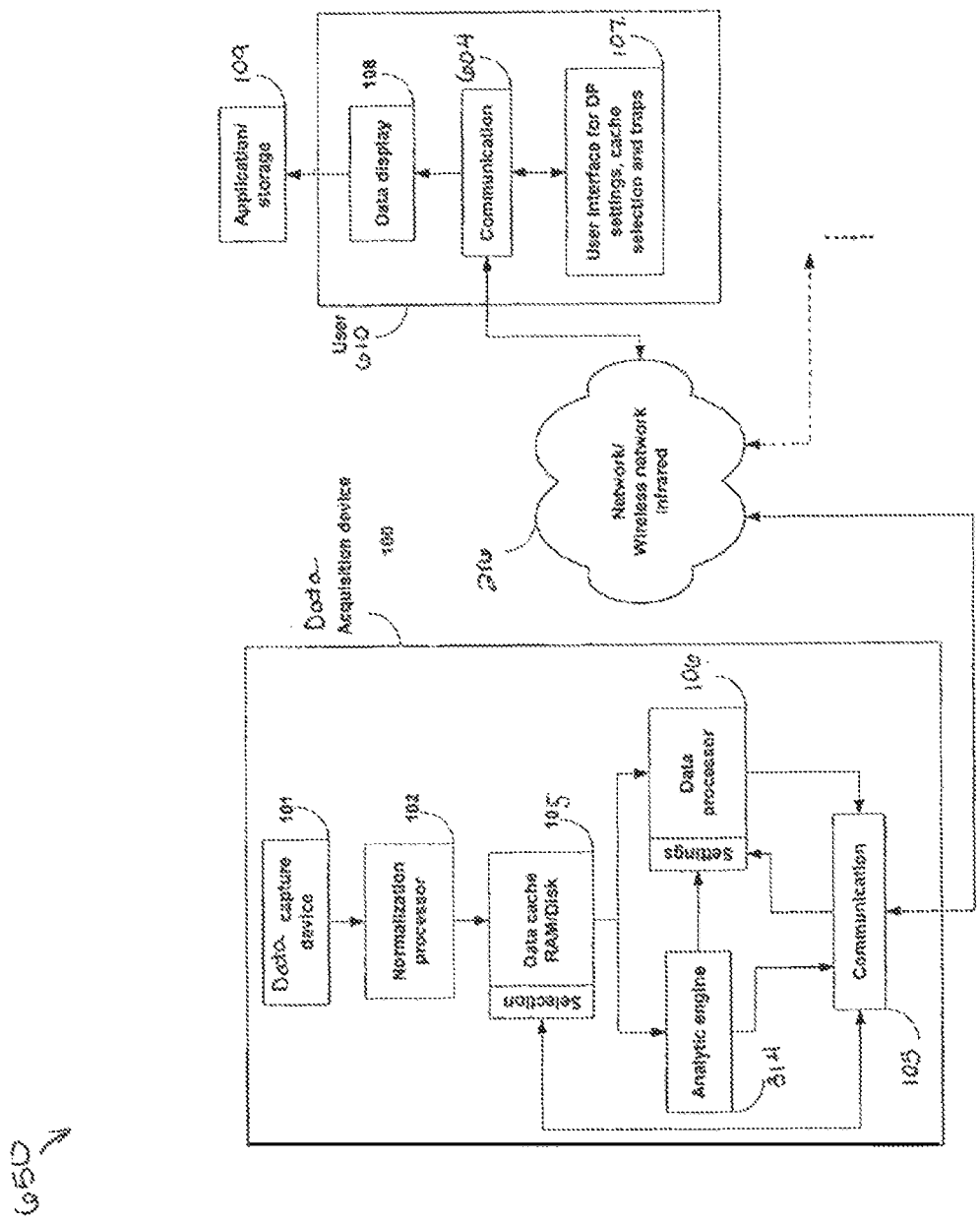
FIG. 6 is a block diagram of a hardware-implemented embodiment of a remotely deployed data acquisition and rescanning system having an analytic engine.

FIG. 6 is a block diagram of a hardware implemented embodiment of a remotely deployed data acquisition and rescanning system 650 comprising the analytic engine 314. The data acquisition and rescanning system 650 implements the data acquisition and rescanning system 450 shown in FIG. 4 in a remote deployment. The data acquisition and rescanning system 650 comprises the data acquisition device 100, a user system 610, and the application/storage device 109.

The random access data cache 105, the data processor 106, and the analytic engine 314 are implemented as hardware on the data acquisition device 100 directly. The data acquisition device 100 further comprises the data capture device 101, the normalization processor, and the communication device 103. The user system 610 comprises the user interface 107, the data display 108, and a communication device 604.

The user system 610 communicates with the data acquisition device 100 via the communication medium 216 using the communication devices 103 and 604.

Figure 7:
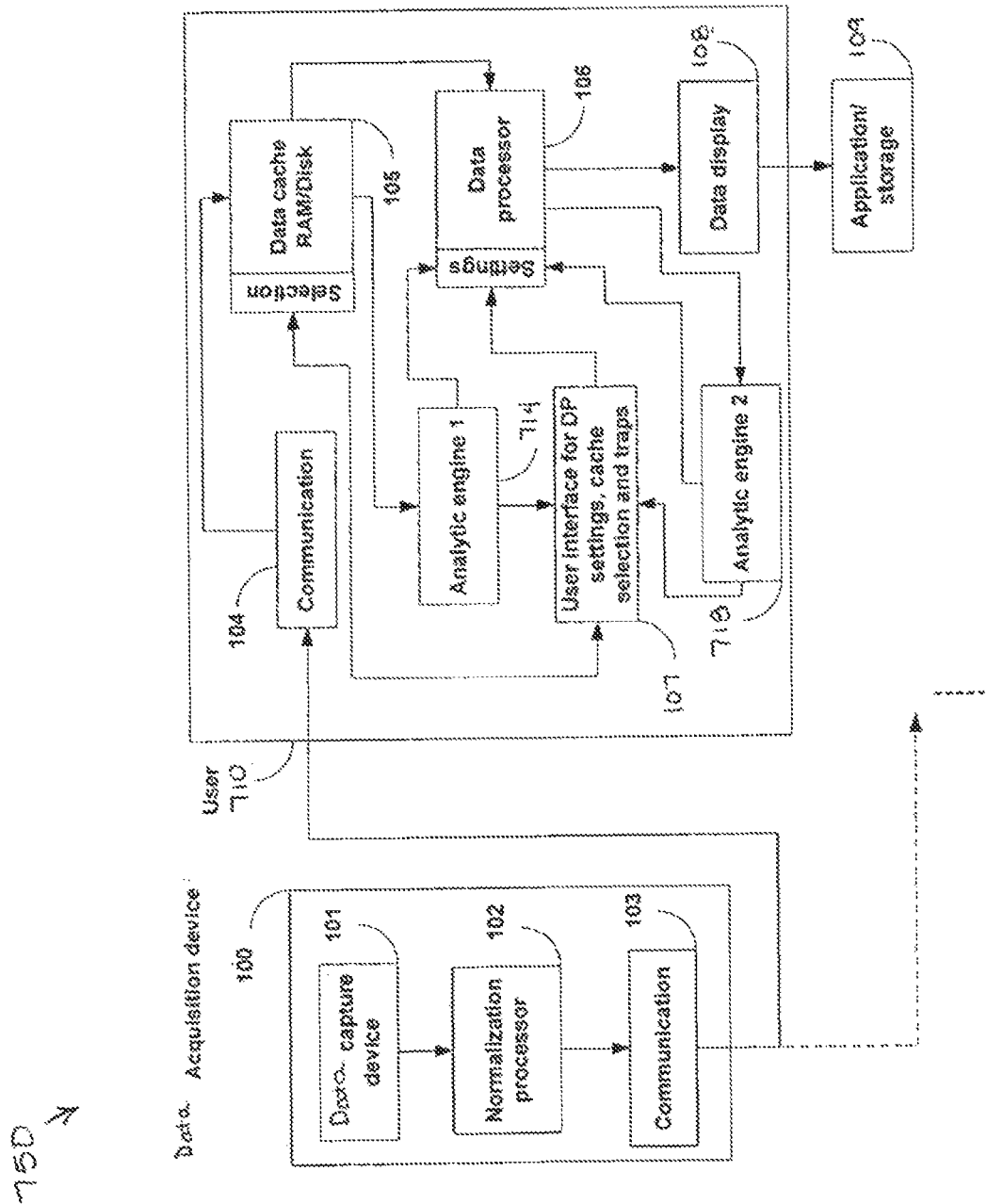
FIG. 7 is a block diagram of an embodiment of a data acquisition and rescanning system having a first and a second analytic engine.

FIG. 7 is a block diagram of an embodiment of a data acquisition and rescanning system 750 having a first analytic engine 714 and a second analytic engine 718. The data acquisition and rescanning system 750 comprises the data acquisition device 100 and a user system 710. The data acquisition device 100 comprises the data capture device 101, the normalization processor 102, and the communication device 103. The user system 710 comprises the communication device 104, the random access data cache 105, the data processor 106, the user interface 107, and the data display 108. The user system 710 further comprises the first analytic engine 714 and the second analytic engine 718. In an embodiment, the first and second analytic engines 714, 718 are first and second acquisition controllers 714, 718, respectively.

Analog data are presented to the acquisition device 100. The data capture device 101 measures the analog data. The normalization processor 102 transforms the measured data into normalized raw data. The raw data are transmitted via a fast connection using the communication devices 103 and 104 to the user system 710.

At the user system 710, the raw data are stored at the data cache 105. The raw data are stored as bands, image strips, data strips, or the like in the random access data cache 105. In an embodiment, the random access data cache is partitioned into 64 K byte bands.

In addition to the raw data, data pertaining to the raw data, or metadata for each band, are also stored at the cache 105. These metadata comprise, but are not limited to, a tag identifying the data and the location in the cache, a time and date stamp of the acquisition, the sequence number, the beginning of the data band, the end of the data band, height, width, a pointer to the next band, and the like. In some embodiments, tags identify subsections or zones of raw data.

Selected raw data are analyzed by the first analytic engine 714. The selection mechanism can be either automatic or interactive as described in the embodiments above. The analysis performed by the first analytic engine 714 yields an improved or close to optimal data processor settings for the selected raw data. In an embodiment, the first analytic engine 714 performs geometric processing, such as for example, document orientation, background compensation, color compensation, text extraction, text/background separation, page boundary detection, streak detection, page border detection, blank page detection, conversion from RGB color representation to a YCbCr color representation, hue measurement, saturation measurement, luminescence measurement, creating a grayscale intensity histogram, creating a color histogram, color detection, gamma detection for brightness and color levels, and the like.

The settings are transferred to the data processor 106, and the raw data are processed given with the settings.

The processed data are transferred to the second analytic engine 718. In an embodiment, the processor 106 sends the processed data to the second analytic engine 718 for analysis. In another embodiment, the processor 106 sends the processed data to the first analytic engine 714 and the first analytic engine 714 sends the processed data to the second analytic engine 718 for analysis.

At the second analytic engine 718 the processed data are analyzed and improved data processor settings are determined. The second analytic engine 718 compares the quality of the processed data to a predetermined metric. The second analytic engine 718 selects new processor settings based on the quality of the processed data as determined by the metric.

In an embodiment, the second analytic engine performs feature or quality processing, such as, for example, recognizing an area of poor optical character recognition, non-linear gamma, high background noise, character color distortion, and the like. In an embodiment, the second analytic engine replaces, at least in part, the user's data review at the data display 108 and the user's revised processor settings input from the user interface 107.

The new settings are transmitted to the data processor 106 and the raw data are reprocessed using the new settings. In an embodiment, the second analytic engine 718 sends the metadata containing the location of the raw data in the random access cache 105 and the new processor settings to the processor 106. The processor 106 processes the data with the new processor settings.

In another embodiment, the second analytic engine 718 sends the metadata associated with the data and the new processor settings to the first analytic engine 714. The first analytic engine 714 receives the metadata containing the location of the raw data in the random access cache 105 and the new processor settings and sends the metadata containing the location of the raw data in the random access cache 105 and the new processor settings to the processor 106. The processor processes the raw data with the new processor settings.

In yet another embodiment, the second analytic engine 718 sends the metadata associated with the data to the first analytic engine 714. The first analytic engine 714 receives the metadata containing the location of the raw data in the random access cache 105 and the new processor settings and processes the band of raw data with the new processor settings.

The processed data are transferred to the second analytic engine 718 for analysis. In an embodiment, the processor 106 sends the processed data to the second analytic engine 718 for analysis. In another embodiment, the first analytic engine 714 sends the processed data to the second analytic engine 718 for analysis. In another embodiment, the processor 106 sends the processed data to the first analytic engine 714 and the first analytic engine 714 sends the processed data to the second analytic engine 718 for analysis.

The step of reprocessing the raw data with the revised data processor settings and the step of analyzing the processed data and determining revised data processor settings are repeated until convergence, i.e. until the metric does not detect any improvements in the quality of the processed data. This yields improved or optimal processor settings.

For example, a scanner scans a document at a resolution of 600 dots per inch (dpi). The document includes text of various font sizes. The raw data are stored in the random access cache 105 in bands, along with the metadata associated with each band of raw data.

To save processing time and user storage space, the first analytic engine 714 sends the processor 106 settings to process the data at a resolution of 200 dpi, for example, along with other possible geometric processing settings, as describe above.

The processor 106 processes the raw data using the settings from the first analytic engine 714. The processed data and the associated metadata are transferred to the second analytic engine 718.

The second analytic engine 718 analyzes the processed data using a predefined metric. For example, the second analytic engine 718 determines that a band of the processed data is not recognizable, perhaps because the text size is too small to be recognizable at a resolution of 200 dpi. The second analytic engine 718 sends the metadata associated with the band of unrecognizable data along with new processor setting to process the data at a resolution of 400 dpi to the processor 106.

The processor 106 receives the metadata containing the location of the raw data in the random access cache 105 and the new processor settings and processes the band of raw data at 400 dpi. The processor 106 sends the processed band of data and its associated metadata to the second analytic engine 718 for analysis.

The second analytic engine 718 determines if the processed band of data meets the predetermined metric. If not, the second analytic engine 718 sends the metadata associated with the band along with new processor settings to process the band of raw data to the processor 106. For example, the second analytic engine 718 determines that the text in the band is unrecognizable even at a resolution of 400 dpi and sends the metadata associated with the band along with new processor settings to process the band of raw data at a resolution of 600 dpi to the processor 106.

The process of analyzing the data and reprocessing the raw data with new processor setting occurs until the second analytic engine 718 determines that the processed data meet the predefined metric. Processing parameters can be changed on portions or bands of the raw data without reprocessing all of the raw data. In an embodiment, reprocessing portions of the captured data saves processing time and data storage space.

The processed data obtained by these steps are displayed at the data display 108. The data processor settings can be adjusted interactively using the user interface 107.

In addition to determining the data processor settings, the first analytic engine 714 and the second analytic engine 718 automatically detect raw data that will potentially result in poor quality processed data. The corresponding trapping conditions, described above, are accessible to the user through the user interface 107, enabling the user to efficiently control the quality of the acquired data.

Additionally the user can, via the user interface 107, access subsections or zones of the raw data stored at the random access data cache 105 to be processed at the data processor 106.

The data acquisition and rescanning system 750 also allows the non real time interactive processing of specific raw data. The user can transmit the processed data to the application/storage device 109 for further processing as well as storage. The data acquisition and rescanning system 750 supports multiple user usage. The acquisition device 100 can be accessed by multiple user systems 710 with each data processor 106 having unique processor settings. In an embodiment, the data acquisition and rescanning system 750 further comprises a computer (not shown). In an embodiment, the data acquisition and rescanning system 750 is implemented, at least in part, as software on the computer.

Figure 8:
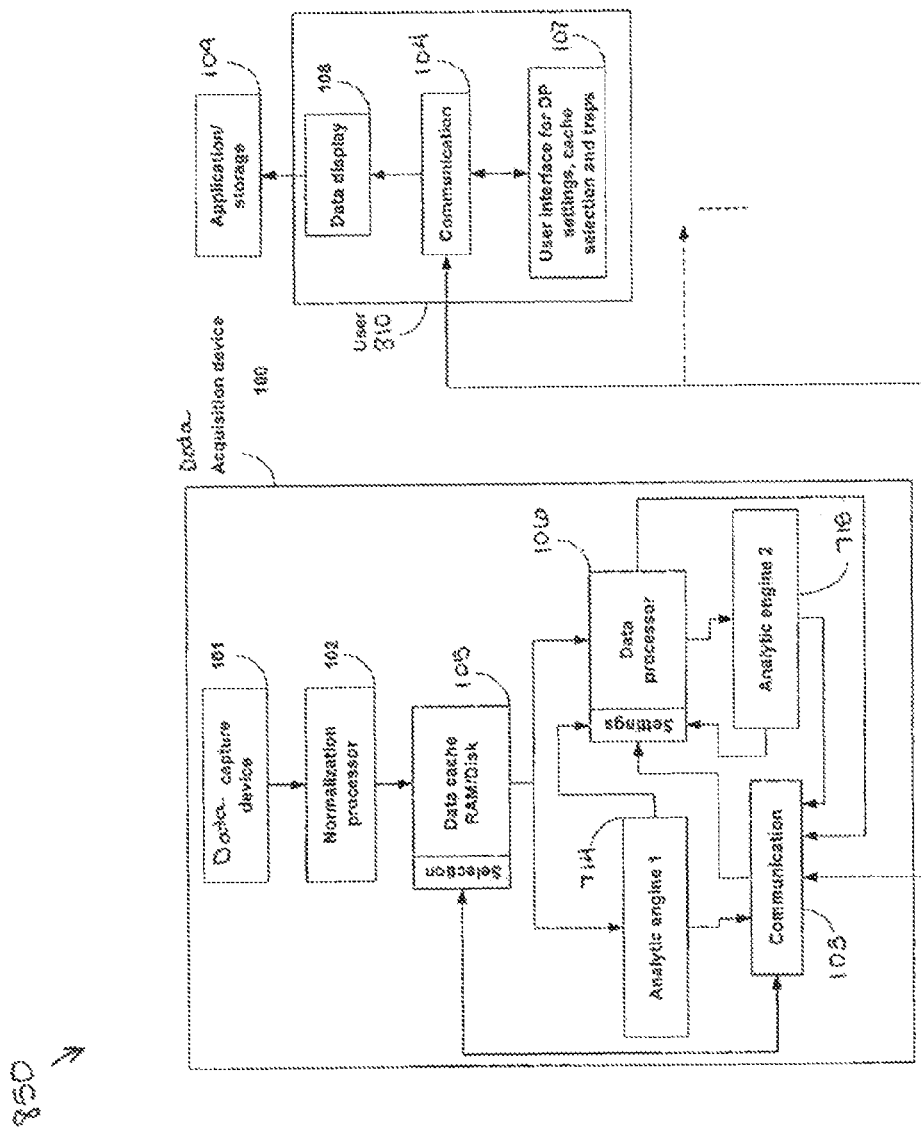
FIG. 8 is a block diagram of a hardware implemented embodiment of a data acquisition and rescanning system having a first and a second analytic engine.

FIG. 8 is a block diagram of an embodiment of a data acquisition and rescanning system 850 comprising the first analytic engine 714 and the second analytic engine 718. The data acquisition and rescanning system 850 implements the data acquisition and rescanning system 750 shown in FIG. 7 as hardware.

The data acquisition and rescanning system 850 comprise the data acquisition device 100, a user system 810, and the application/storage device 109. The random access data cache 105, the data processor 106, the first analytic engine 714, and the second analytic engine 718 are implemented at the data acquisition device 100. The data acquisition device 100 further comprises the data capture device 101, the normalization processor 102, and the communication device 103. The user system 810 comprises the communication device 104, the user interface 107, and the data display 108.

Figure 9:
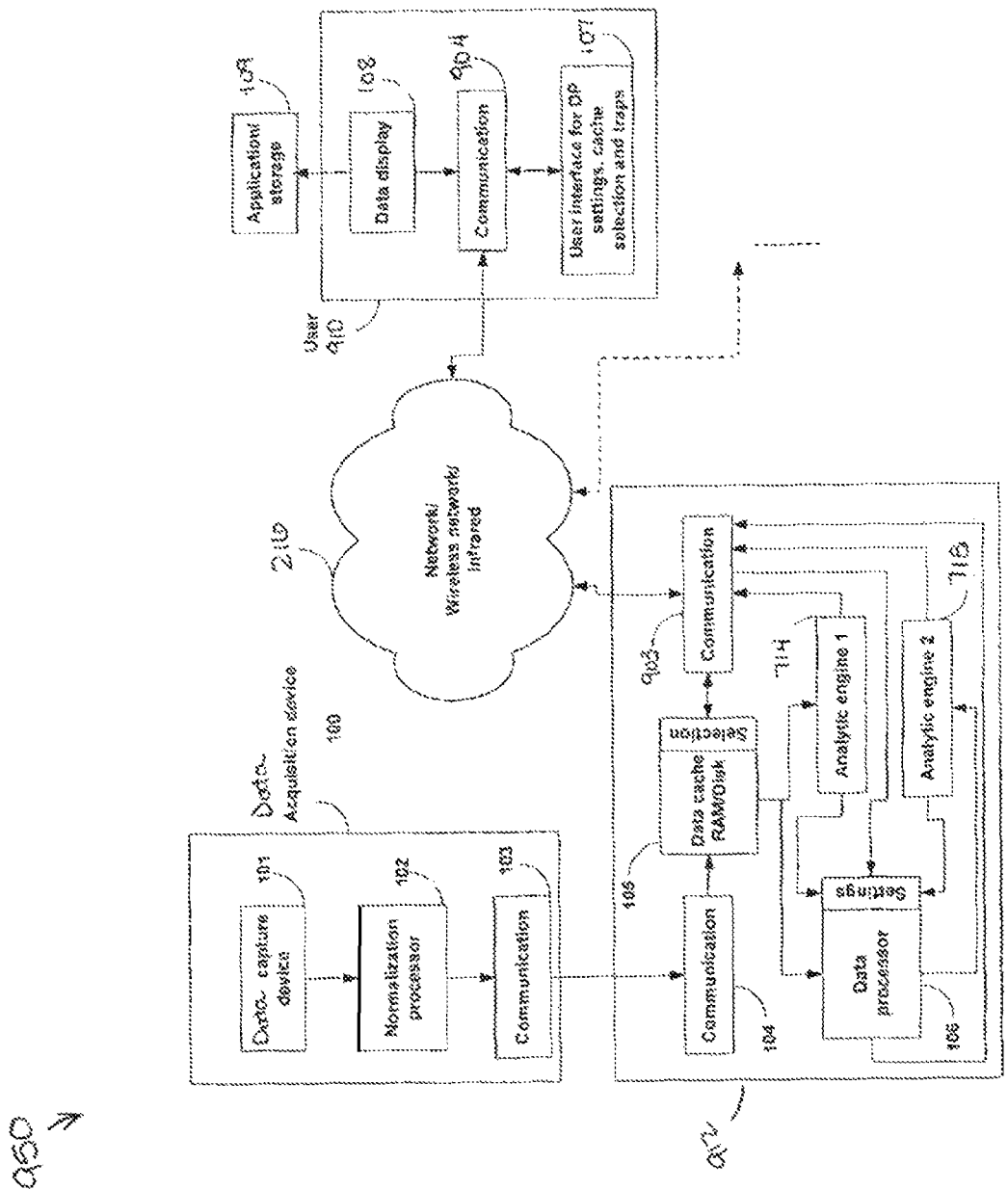
FIG. 9 is a block diagram of an embodiment of a remotely deployed data acquisition and rescanning system having a first and a second analytic engine.

FIG. 9 is a block diagram of an embodiment of a remotely deployed data acquisition and rescanning system 950 comprising the first analytic engine 714 and the second analytic engine 718. The data acquisition and rescanning system 950 comprises the data acquisition device 100, a storage and processing system 912, a user system 910, and the acquisition/storage device 109.

The data acquisition device comprises the data capture device 101, the normalization processor, and the communication device 103.

The storage and processing system 912 comprises the communication device 104, the random access data cache 105, the data processor 106, the first analytic engine 714, the second analytic engine 718, and a communication device 903.

The user system 910 comprises a communication device 904, the user interface 107, and the data display 108.

The raw data from the acquisition device 100 are transmitted, via a fast connection using the communication devices 103 and 104, to the storage and processing system 912. The raw data and the metadata are stored at the cache 105. The data processor 106 processes the raw data using the default data processor settings.

At the data storage and processing system 912, the raw data are stored at the data cache 105. Selected raw data are analyzed by the first analytic engine 714. The selection mechanism can be either automatic or interactive as described in the embodiments above. The analysis performed by the first analytic engine 714 yields an improved or close to optimal data processor settings given the selected raw data. The settings are transferred to the data processor 106, and the raw data are processed with the given settings.

The processed data are transferred to the second analytic engine 718. At the second analytic engine 718 the processed data are analyzed and improved data processor settings are determined. The second analytic engine 718 determines the quality of the processed data using a metric. The second analytic engine 718 selects new processor settings depending on the quality of the processed data as determined by the metric. The improved settings are transmitted to the data processor 106 and the raw data are reprocessed. The step reprocessing the processed data with the revised data processor settings and the step of analyzing the processed data and determining revised data processor settings are repeated until convergence, i.e. until the metric cannot detect any improvements in the quality of the processed data, as described above. This yields improved or optimal processor settings.

The user system 910 communicates with the storage and processing system 912 via a communication medium 216 using the communication devices 903 and 904. The processed data are displayed at the data display 108. The data processor settings can be adjusted interactively using the user interface 107.

The user, through the user system 910, can transmit the processed data to the application/storage 109 for further processing as well as storage. Additionally the user can, via the user interface 107, access subsections, or zones of the raw data stored at the random access data cache 105 to be processed at the data processor 106.

The data acquisition and rescanning system 950 allows the non real time interactive processing of specific raw data. The data acquisition and rescanning system 950 is similar to the data acquisition and rescanning system 750 with the user system 910 located remotely from the data acquisition device 100 and the storage and processing system 912. In the remotely deployed system 950, the data cache 105, the data processor 106, the first analytic engine 714, and the second analytic engine 718 are local to the data acquisition device 100.

The data acquisition and rescanning system 950 also supports multiple user usage. The data acquisition device 100 can be accessed by multiple user systems 910 with each data processor 106 having unique processor settings. The data acquisition and rescanning system 950 is implemented, at least in part, as software, firmware, or a combination of software and firmware.

Figure 10:
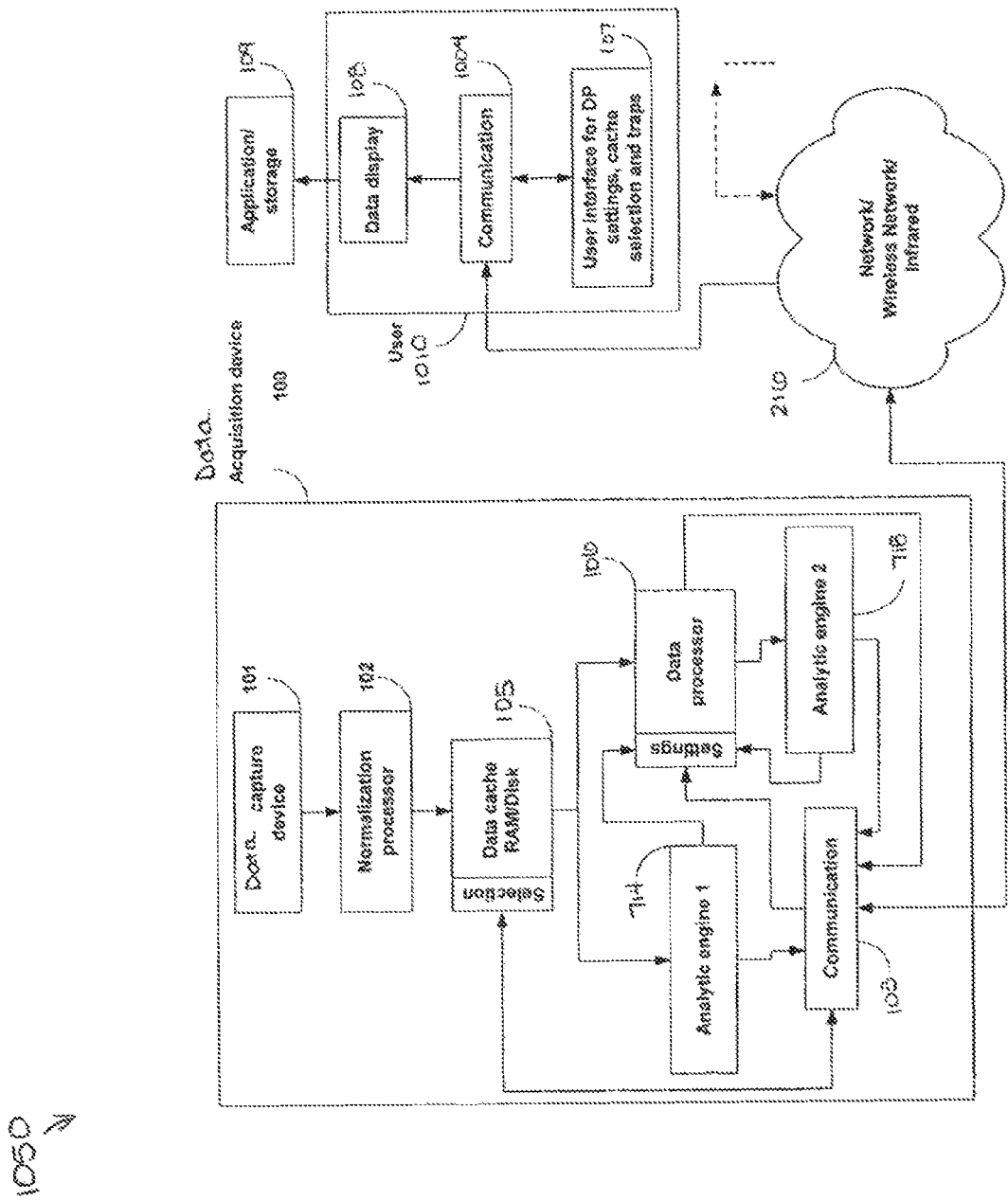
FIG. 10 is a block diagram of a hardware implemented embodiment of a remotely deployed data acquisition and rescanning system having a first and a second analytic engine.

FIG. 10 is a block diagram of a hardware implemented embodiment of a remotely deployed data acquisition and rescanning system 1050 comprising the first analytic engine 714 and the second analytic engine 718. The data acquisition and rescanning system 1050 implements the data acquisition and rescanning system 850 shown in FIG. 8 in a remote deployment. The data acquisition and rescanning system 1050 comprises the data acquisition device 100, a user system 1010, and the application/storage device 109.

The random access data cache 105, the data processor 106, the first analytic engine 714, and the second analytic engine 718 are implemented as hardware at the acquisition device 100. The data acquisition device 100 further comprises the data capture device 101, the normalization processor 102, and the communication device 103.

The user system 1010 comprises the user interface 107, the data display 108, and a communication device 1004. The user system 1010 communicates with the data acquisition device 100 via the communication medium 216 using the communication devices 103 and 1004.

Figure 11:
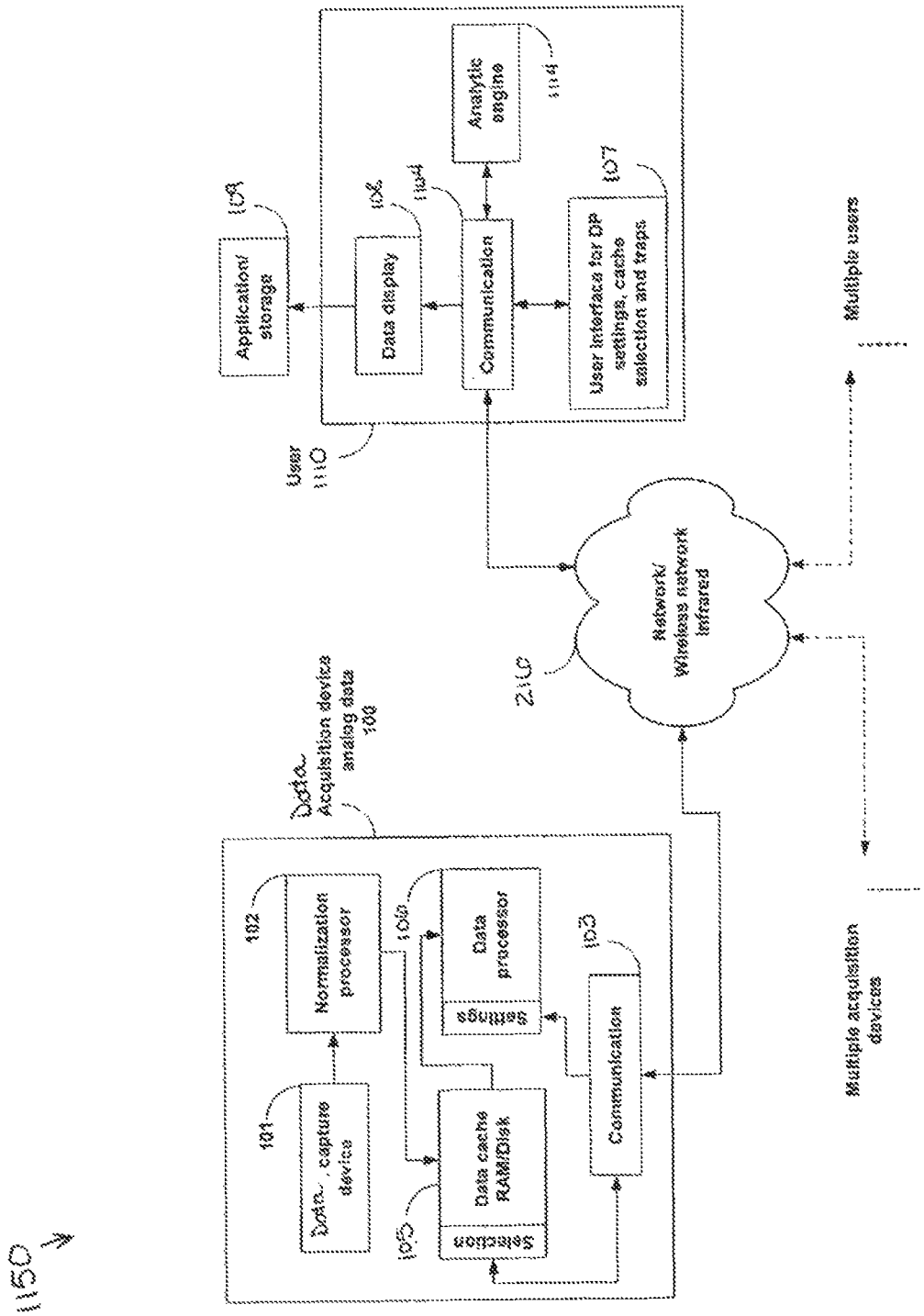
FIG. 11 is a block diagram of an embodiment of a data acquisition and rescanning system comprising multiple acquisition devices and having multiple users.

FIG. 11 is a block diagram of an embodiment of a data acquisition and rescanning system 1150 comprising a plurality of data acquisition devices 100 and a plurality of user systems 1110. The plurality of user systems 1110 are located remotely from the plurality of data acquisition devices 100.

The data acquisition device 100 comprises the data capture device 101, the normalization processor 102, the communication device 103, the random access data cache 105, and the data processor 106. In an embodiment, the data processor 106 is a low processing capability engine.

The user system 1110 comprises the user interface 107, the data display 108, a communication device 1104, and an analytic engine 1114. In an embodiment, the analytic engine 1114 is a high performance analytic processor.

Analog data are presented to the acquisition device 100. The analog capture device 101 measures the analog data. The normalization processor 102 transforms the measured data into normalized raw data. The data processor 106 is used for transformations of the data. The transformed data are stored at the random access data cache 105. Examples of data processing include, but are not limited to, document orientation, background compensation, color compensation, text extraction, text/background extraction, threshold, correlation, despeckle, and the like.

Working in a real time broadcast push mode or upon request from at least one of the user systems 1110, selected cached data are scaled and compressed by the data processor 106. The communication device 105 sends the scaled and compressed data, and the associated tag or metadata to the user system 1110 via the communication medium 216 using the communication device 103.

In an embodiment, the tag data comprises the capture device address and the data location in the cache 105. In an embodiment, the metadata comprise, but are not limited to, a tag identifying the data and the location in the cache, a time and date stamp of the acquisition, the sequence number, the beginning of the data band, the end of the data band, height, width, a pointer to the next band, and the like. The tag data is embedded in the communication network protocol of the communication medium 216.

The user system 1110 receives the data via the communication medium 216 and the communication device 1104. The data is analyzed by the analytic engine 1114. If the analysis detects some relevant data area(s) characterized by analysis results that are outside of a boundary determined by the user, the analytic engine 1114 activates the user interface 107 by sending the tag associated with the data and the location of the area(s) of interest within the data.

The user interface 107 can be an automatic or a manual operation. The user interface 107 uses the tag content and the area location to request a new data set with new processing settings from the corresponding data capture device 100. The data processor 106 reprocesses the selected data using the new settings and the data capture device 100 retransmits the reprocessed data to the user system 1110. This virtual rescan operation is an interactive process, which can use different settings or windows.

During the interactive process described above, the data continue to be transmitted in real time by the plurality of the capture devices 100 to the plurality of user systems 1110. In an embodiment, the user, through the data display 108, can visualize any of the incoming data. In an embodiment, any part of the receiving data can be stored by the application/storage device 109.

In an embodiment, the user system 1110 can lock selected data in the data cache 105 of one or more data acquisition devices 100 associated with the selected data. When the user system 1110 receives the selected data at the desired resolution, the user system 1110 unlocks the data. In an embodiment, the user system 1110 has an authorization level in order to lock data. The non-locked data in the data cache 105 is overwritten in a first in first out model.

Exemplary Embodiments

This section includes exemplary embodiments of a virtual rescan workflow, a detection orientation method, a detect bleed-through method, a color detection method, a background smoothing method, and a detection of scanned page boundaries method.

Exemplary Virtual Rescan (VRS) Workflow

If, in an embodiment, the user chooses to scan images with VRS processing, the VRS processing initializes the scanner to acquire a raw (unprocessed) master image. The master image is in grayscale if the user chooses to scan in black and white, else the master image is in grayscale or color as the user specifies.

VRS processing also initializes the scanner using predefined scanner specific settings. These settings help the VRS processing improve performance. For example, one of the settings is to perform overscanning (i.e., scan more than the size requested so VRS can perform a good deskew operation).

The scanner scans an image, per the specified settings, and the raw image is transmitted from the scanner to a VRS cache.

The VRS software performs one or more image processing algorithms. In an embodiment, an analytic engine comprises the VRS. One algorithm determines the actual page boundaries within the scanned raw image. In an embodiment, the scanned image contains scanner-introduced background due to overscanning. Determining the page boundaries is done for a variety of backgrounds, such as black, white, grey, and the like. Techniques, such as streak detection, are used, for example, for line streaks introduced by a dirty scanner camera/lamp, rollers, or the like. Other techniques, such as page border shadow detection are used to determine a page boundary.

Another image processing algorithm determines if the scanned page is blank. A page may contain colors that bleed through from the other side of the page when scanning is done in duplex. If the algorithm determines that the page contains no content, the page can be deleted per the user setting.

Another image processing algorithm converts the page contents from an RGB color representation to a YCbCr (luminance, hue, and saturation format). This permits many color related operations on the hue and saturation aspects of the page, and hence, results in a speed improvement. If the scanner scans the image in black and white, this step is not performed.

Yet another image processing algorithm analyzes the image. Possible analyses are performing luminance analysis and extracting the grayscale intensity information into a histogram, extracting color information into a color histogram, performing geometric analysis on the page, and the like.

Another image processing algorithm detects whether the document has color, based on previous analyses. If there is no color content, the algorithm sets the scanner settings to indicate that the document is a black and white document. If document has background color and that background color is the predominant color, the algorithm sets the scanner settings to indicate that the document is a color document. Additionally, if the document contains color content, the user can adjust the scanner settings to reproduce the color or not to reproduce the color, based on a determination of whether the color content is related to specific document content, or is a predominate characteristic of the document, such as a document on yellow paper.

Another image processing algorithm performs gamma correction on the image to adjust the brightness and color levels.

A further image processing algorithm performs deskew and cropping on the page image based on the previous analyses.

Yet another image processing algorithm detects textual orientation in the image and rotates the image orthogonally, if required.

Another image processing algorithm performs other operations, such as, for example, barcode detection, line filtering, despeckling, annotating with an endorsement string, or the like.

A further image processing algorithm performs background smoothing by detecting the background colors and merging them together.

If the image has problems that cannot be corrected automatically, the image processing software displays the processed image and the settings to the user. The user then determines the settings for the image. As the user changes the settings, the image processing software performs one or more of the image processing algorithms discussed above using the user specified settings and displays the processed image to user. When the user accepts the image, the image processing software re-processes the raw image using the final settings chosen by the user.

In another embodiment, a second analytic engine performs additional analyses to determine if the processed image meets predetermined requirements. If the image does not meet the predetermined requirements, the second analytic engine determines new settings and reprocess the raw image using the new settings. This process repeats until the image meets the requirements.

When the image processing is complete, the image processing software sends the image to the application.

Exemplary Detect Orientation

In an embodiment, the detect orientation algorithm automatically detects which way to orthogonally rotate a text page for viewing. The algorithm selects possible individual characters from connected components of black within the page. The algorithm then determines the orientations of the individual characters by employing a trained neural network. The algorithm uses the orientation results of the neural network to determine a better page orientation.

The algorithm finds the connected components within the page image. Since some of these components can contain graphic elements, the algorithm uses a number of constraints to filter out non-characters within the page image. Examples of the constraints are the number of pixels exceeds a predetermined threshold; both width and height are large enough; the ratio of height to width does not exceed a predetermined threshold; the ratio of the number of black pixels in the connected component to the area of its bounding box is not too large or too small; the size of the component does not approach the size of the page; and the number of transitions from white to black and back along a line crossing the character in either horizontal or vertical direction is not too large.

Some of the components passing this test may contain glued characters, pieces of broken characters, and the like. In an embodiment, assuming reasonable image quality, a statistically meaningful majority contains individual characters.

The algorithm proportionally scales of each of the components to fit into a gray-scale square of 20 by 20 pixels. The algorithm then adds a 2 pixel white margin around the gray-scale square and sends the resulting 24×24 image to a trained feed-forward neural network for orientation detection.

The neural network used in the algorithm, in an embodiment, has a preprocessing layer that converts the 576 inputs into 144 features. The features pass through two hidden layers of 180 and 80 nodes, respectively. The result of the neural network is four outputs indicating confidences in "up", "down", "left", or "right" orientation. This neural network with its rather distinct preprocessing using Gabor Wavelets has been described in the papers, "A Subspace Projection Approach to Feature Extraction: The Two-Dimensional Gabor Transform for Character Recognition", Neural Networks, 7 (8), pp. 1295-1301, 1994, and "Neural Network Positioning and Classification of Handwritten Characters". Neural Networks 9 (4), pp. 685-693, 1996. The training of the neural network is not a part of the run-time algorithm and is performed off-line using scaled characters from common business fonts, such as, for example, Arial, Times Roman, Courier, and the like.

Next, the algorithm decides whether to accept the orientation having the highest confidence level. The algorithm decides based on confidence ratios that exceed predetermined thresholds.

For increased or maximum accuracy, in an embodiment, the analysis of the page utilizes the components found within it. Typically, for most text pages a small percentage of the components is sufficient to make a confident decision. To achieve a reasonable tradeoff between accuracy and speed, the page is divided into several sets of stripes. The stripes in each set are distributed over the page to make the selection of components quasi-random. If, in an embodiment, the number of good connected components in the first set exceeds a predefined number and the votes confidently determine the winning orientation, the algorithm returns the result. Otherwise, the next set of stripes is processed, then the next, etc. until the end condition is met, or until all or a predetermined percentage of the components on the page have been examined.

Recognition of character shapes becomes more difficult as the font size and resolution become smaller. For the algorithm to perform well, in an embodiment, the height of binary characters exceeds 16 pixels. The algorithm can show graceful degradation for characters up to 8 pixels in height.

The algorithm, in an embodiment, may assume that the majority of connected components on the page are individual characters.

Embodiments of the algorithm have been trained with the Latin alphabet. Since there are many common shapes between Latin and Cyrillic as well as between the Latin and Greek alphabets, the algorithm also performs well for Cyrillic and Latin. The algorithm can be trained specifically for different character sets.

Exemplary Detect Bleed-Through

An embodiment of the detect bleed-through algorithm addresses automatically detecting bleed-through on sides of scanned documents in order to perform further image processing on these pages. In an embodiment, the algorithm uses page boundary detection within front and back scanned images to approximately match side coordinates. Then, the algorithm uses existing color or gray content to fine-tune the mapping. This additional step can be used because of slightly different optics and skews of front and back cameras. If residual (unexplained) content fall below predetermined density criterion, the algorithm determines that the page is blank.

In an embodiment, the algorithm detects each side of the page against the background of the scanner. Next, the algorithm runs individual blank page detection on both sides of the page to determine if one or both sides of the page are blank regardless of possible bleed-through. If one or both sides are blank, the algorithm ends.

If one or both sides are not blank, the algorithm determines the main background of the page on both sides. Next, the algorithm chooses the side with greater volume of content as the front side. Next, the algorithm maps the back side to the front side using corresponding rectangles of the page.

Dark pixels with color sufficiently different from the background are marked on both sides to form mask images. The algorithm analyzes the mask images locally block by block to determine the local shift relative to the rough mapping. Next, the algorithm uses a Least Mean Squares approximation to finalize the back-to-front mapping. The algorithm cancels content on the back side within a predefined distance of darker content on the front side, and then the algorithm sends the residual image to the blank page detection step.

Exemplary Color Detection

An embodiment of the color detection algorithm detects the color content in a scanned image and distinguishes between the foreground and background color. The algorithm eliminates the background color if it is the most predominant color in the document. The algorithm examines pixels in the scanned image and determines if the pixel is a color pixel and if the pixel is a background pixel. This determination uses the saturation and luminance levels of the pixel.

In an embodiment, the algorithm converts the image from an RGB representation to a YCbCr (Luma and Chrominance) representation. The algorithm looks at the saturation component of the pixel to determine the saturation level. Saturation provides a measure of the amount of color in a pixel. The higher the saturation, the more vivid the color. The lower the value, the less color the pixel contains. Saturation is expressed as a number between 0 and 182, which comes from the mathematical formulation used to calculate saturation. A user adjustable color threshold value, in an embodiment, is used to determine if a pixel is a color pixel. If the saturation value is greater than the threshold, the pixel is color, else it is not.

The algorithm determines if the pixel is a background pixel. When scanner scans a document, the white or black background of the document and/or the scanner can appear as a low saturated light or dark color. For most images, the amount of background pixels is a large percentage of the total area. The color detection algorithm, in order to exclude the contributions of the white and/or black background portions of an image, uses a white background threshold, a black background threshold, and a background saturation threshold to determine background pixel membership. If, in an embodiment, the luminance of a pixel is higher than the white background threshold or lower than the black background threshold, and the saturation of the pixel is lower than the background saturation threshold, then the pixel is a classified as a background pixel. Otherwise, the pixel is non-background pixel.

The algorithm analyzes the non-background pixels to determine the various color contents by building a histogram of the pixels based on their saturation values. A scanner can introduce some color to the scanned image because of the lamp or the camera. A dirty camera can add color spots, for instance. If a color saturation value of a pixel is below a predetermined threshold, the algorithm determines that the pixel does not have color. Otherwise, the pixel is considered a valid color. If the document contains any valid color, the document is considered a color document.

Exemplary Background Smoothing

An embodiment of the background smoothing algorithm reduces the number of colors within the backgrounds of an image to improve the appearance of the image as well as decreases the size of the image after compression.

The algorithm clusters the colors found in the image and selects those that contain enough pixels to be considered backgrounds.

The algorithm determines the co-occurrence of the background clusters to determine if two or more clusters actually represent a single background. These types of backgrounds are commonly generated by dithering or using micro-dots, which the eye perceives as the averaged color within the background. When the scanner scans the image at a high resolution, the individual colors are seen for each of the pixels. The algorithm merges the co-occurring clusters and calculates an average color for the cluster.

Then, the algorithm determines if backgrounds have neighboring clusters with colors that are slightly darker or slightly brighter. Often, when scanning, for example, the paper going through the transport will buckle due to the rollers and forces acting on the paper, and can create shadows and highlights within the image. These shadows and highlights can be perceived as different clusters and they can be merged with the main background.

The algorithm modifies the image pixel by pixel by searching the image and determining if the color of the pixel belongs to one of the background dusters. If the pixel belongs to a background cluster, the algorithm changes the pixel color to the averaged color of the duster.

Exemplary Detection of Scanned Page Boundaries

The detection of scanned page boundaries algorithm automatically detects page boundaries within a scanned image. Generally, page skew detection algorithms used in the industry work reliably only for black background scanning where the contrast between very dark background of the scanner and typically white page is difficult to miss. In an embodiment, this algorithm detects the page against any background, thus, performing page skew correction and cropping even for white background scanners.

Since there may be very small color or gray level differences between the background of the scanner and the background of the page, the differences alone cannot be relied upon to detect the page boundary points. Instead, the algorithm calculates and compares statistics collected in a small window centered on pixels of analysis. The algorithm compares these statistics to the range of the statistics collected in the corners of the scanned image, where the algorithm expects the background of the scanner.

The algorithm calculates the statistics in the four corners of the scanned image. If some of the corners are not uniform, which can occur when the content of the page is close to the corner, the algorithm does not consider the non-uniform corners.

If some of the corners are significantly different from the other corners, the algorithm chooses the majority of like corners. If the choice has to be made between equally plausible alternatives, the algorithm compares the corners to the background of the inside of the scanned image in order to disqualify the background of an over-cropped page.

For qualifying corners, the algorithm aggregates the statistics of the scanner background for later use.

The algorithm searches rows and columns of the scanned image looking for the first and last pixel with statistical properties significantly different from those of the scanner background. Predetermined thresholds determine the significance of the deviations of the pixel-centered windows from the range of the scanner background.

The detected first and last non-background pixels can be used to determine candidate edge points. Several constraints are used to filter out outliers. For example, if searching for the left boundary of the page, the candidate edge point has immediate neighbors above and below such that the angles formed by connecting segments are within 45 degrees from the vertical and are close to each other. Candidate edge points are analyzed with a variant of a Least Mean Square approximation to find best straight lines representing the main rectangle of the page. The algorithm assigns a confidence measure to the found rectangle based on the ratio of edge points supporting the rectangle to the maximum possible number of edge points, which may depend on the size of the page, the resolution of the scan, and the like.

After the algorithm determines the angle of skew, the algorithm, checks if individual edge points outside of the main rectangle of the page have enough support from their neighbors to indicate a tab or another existing deviation from the assumed rectangular shape of the page. Edge points deemed meaningful are used to determine the crop lines.

In case of dual scanning, the algorithm reconciles the skew angles between the front and back of the page image. If the angles of skew detected on the front side are different from that of the back side, it is likely that one of the two is wrong. In this case, the algorithm uses the angle associated with the higher confidence and recalculates crop lines for the other side.

Similarly, if the crop lines on the front and back significantly disagree, the algorithm reconciles the crop lines between the front and back of the page image. The algorithm considers the differences between the main rectangle of the page and its crop line to determine and remove extensions due to scanner artifacts.

In an embodiment, the detection of page boundaries algorithm assumes that the background of the scanner is uniform, that variation in brightness between individual sensors over the width of the scan are not significant, and that there are very few non-functioning or badly calibrated sensors causing streaks.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A method, comprising:
receiving data from a data capture device,
analyzing at least portions of the received data to determine whether the received data is within a first set of parameters, and if not:
generating a first set of processor settings in response to determining the received data is not within the first set of parameters;
processing the received data with the first set of processor setting to transform the received data into processed data according to one or more of: geometric processing, document orientation processing, background compensation, color compensation, text extraction, separation of text from background, page boundary detection, streak detection, page border detection, color scheme conversion, hue measurement, saturation measurement, luminescence measurement, grayscale intensity histogram analysis, color histogram analysis, gamma detection, and color detection; and
analyzing at least portions of the processed data to determine whether the processed data is within a second set of parameters, and if not:
generating a second set of processor settings to repress the received data; and
reprocessing the received data using the second set of processor settings; and
outputting at least one or the received data, the processed data, and the reprocessed data for inspection by a user;
wherein the second set of parameters is different than the first set of parameters,
wherein the second set of parameters comprises a predetermined metric, and wherein at least one of the first set of processor settings and the second set of processor settings relate to one or more image characterstics selected from: brightness, contrast, gamma, erosion, orientation, segmentation, saturation, color rendering, resolution, warp angle, skew angle, despeckling, dilation and sequence detection.

2. The method as recited in claim 1, wherein a first analytic engine is used to perform;
the analyzing the at least portions of the received data to determine whether the received data is within the first set of parameters; and
the generating the first set of processor settings in response to determining the received data is not within the first set of parameters.

3. The method as recited in claim 2, wherein the first analytic engine is also used to perform the reprocessing.

4. The method as recited in claim 2, further comprising sending the second set of processor settings and metadata relating to the received data to the first analytic engine.

5. The method as recited in claim 4, further wherein the reprocessing is based at least in part on the metadata.

6. The method as recited in claim 4, further comprising displaying the metadata and at least some of the received data; and
receiving user input relating to at least one of the displayed metadata and the displayed data.

7. The method as recited in claim 4, wherein the metadata comprise one or more of:
a tag identifying a subsection of the received data;
a tag identifying a storage location of the received data;
a sequence number;
an indicator corresponding to a beginning of a data band;
an indicator corresponding to an end of the data bend; and
a pointer corresponding to a second data band.

8. The method as recited in claim 4, further comprising storing the metadata in a computer accessible storage medium, the metadata relating to one or more of the received data and the processed data.

9. The method as recited in claim 1, wherein a second analytic engine is used to perform:
the analyzing the at least portions of the processed data to determine whether the processed data is within the second set of parameters; and
the generating the second set of processor setting in response to determining the processed data is not within the second set of parameters.

10. The method as recited in claim 1, wherein a first analytic engine is used to perform:
the analyzing the at least portions of the received data to determine whether the received data is within the first set of parameters;
the generating the first set of processor settings in response to determining the received data is not within the first set of parameters; and
the reprocessing; and
wherein a second analytic engine is used to perform:
the analyzing the at least portions of the processed data to determine whether the processed data is within the second set of parameters; and
the generating the second set of processor settings in response to determining the processed data is not within the second set of parameters.

11. The method as recited in claim 1, wherein the processing comprises applying one or more algorithms to the received data, the one or more algorithms being selected from: a detection orientation algorithm, a detect bleed-through algorithm, a background smoothing algorithm, and a detection of page boundaries algorithm.

12. The method as recited in claim 1, wherein the reprocessing comprises applying one or more algorithms to the processed data, the one or more algorithms being selected from: a detection orientation algorithm, a detect bleed-through algorithm, a background smoothing algorithm, and a detection of page boundaries algorithm.

13. The method as recited in claim 1, wherein at least one of the analyzing at least portions of the received date and the analyzing at least portions of the processed data comprises performing one or more analyses selected from:
streak detection;
blank page detection;
shadow detection;
color representation conversion;
luminescence measurement;
grayscale intensity histogram analysis; and
color intensity histogram analysis.

14. The method as recited in claim 1, wherein the data capture device comprises a mobile phone.

15. The method as recited in claim 1, further comprising at least one of:
alerting the user that the received data is potentially of low quality in response to determining the received data is not within the first set of parameters; and
alerting the user that the processed data is potentially of low quality in response to determining the processed data is not within the second set of parameters.

16. The method as recited in claim 15, further comprising:
receiving third processor settings from the user at least partially in response to the alerting, and
repeating the reprocessing using the third processor settings received from the user.

17. The method as recited in claim 1, further comprising repeating the steps of:
analyzing at least portions of the processed data to determine whether the processed data is within the second set of parameters, and if not:
generating the second set of processor settings to reprocess the received data; and
reprocessing the received data with the second set of processor settings until the processed data is within the second set of parameters.

18. The method as recited in claim 1, wherein at least one of the processing and the reprocessing comprises page boundary detection.

19. The method as recited in claim 18, wherein the page boundary detection comprises:
statistically analyzing portions of at least one of the received data and the processed data, the statistically analyzed portions corresponding to at least two image corner regions;
aggregating results of the statistically analyzed portions; and
defining one or more background properties based at least in part on the aggregated results.

20. The method as recited in claim 19, wherein the page boundary detection further comprises identifying one or more pixels characterized by at least one statistical property significantly different from at least one of the background properties.

21. A computer program product for virtual image reacquisition, the computer program product comprising a non-transitory computer readable storage medium having computer readable program code embodied therewith, the computer readable program ode comprising:

computer readable program code configured to receive data from a data capture device;

computer readable program code configured to analyze at least portions of the received data to determine whether the received data is within a first set of parameters, and if not:
- generate a first set of processor settings in response to determining the received data is not within the first set of parameters;
- process the received data with the first set of processor settings to transform the received data into processed data according to one or more of: geometric processing, document orientation processing, background compensation, color compensation, text extraction, separation of text from background, page boundary detection, streak detection, page border detection, color scheme conversion, hue measurement, saturation measurement, luminescence measurement, grayscale intensity histogram analysis, color histogram analysis, gamma detection, and color detection; and
- analyze at least portions of the processed data to determine whether the processed data is within a second set of parameters, and if not:
  - generate a second set of processor settings to reprocess the received data; and
  - reprocess the received data using the second set of processor setting; and computer readable program code configured to output at least one of the received data, the processed data, and the reprocessed data for display on a mobile device;

wherein the second set of parameters is different than the first set of parameters, wherein the second set of parameters comprises a predetermined metric, and wherein at least one of the first set of processor settings and the second set of processor settings relate to one or more image characteristics selected from: brightness, contrast, gamma, erosion, orientation, segmentation, saturation, color rendering, resolution, warp angle, skew angle, despeckling, dilation and sequence detection.

22. The computer program product as recited in claim 21, further comprising computer readable program code configured as a first analytic engine, the first analytic engine comprising computer readable program code configured to perform:
- the analyzing the at least portions of the received data to determine whether the received data is within the first set of parameters; and
- the generating the first set of processor settings in response to determining the received data is not within the first set of parameters.

23. The computer program product as recited in claim 22, wherein the first analytic engine is also configured to perform the reprocessing.

24. The computer program product as recited in claim 22, further comprising computer readable program code configured to send the second set of processor settings and metadata relating to the received data to the first analytic engine.

25. The computer program product as recited in claim 24, wherein the reprocessing is based at least in pan urn the metadata.

26. The computer program product as recited in claim 24, further comprising computer readable program code configured to display the metadata and at least some of the received data; and
computer readable program code configured to receive user input relating to at least one of the displayed metadata and the displayed data.

27. The computer program product as recited in claim 24, wherein the metadata comprise one or more of:
- a tag identifying a subsection of the received data;
- a tag identifying a storage location of the received data;
- a sequence number;
- an indicator corresponding to a beginning of a data band;
- as indicator corresponding to an end of the data band; and
- a pointer corresponding to a second data band.

28. The computer program product as recited in claim 24, further comprising storing the metadata in a computer accessible storage medium, the metadata relating to one or more of the received data and the processed data.

29. The computer program product as recited in claim 21, further comprising computer readable program code configured as a second analytic engine, the second analytic engine comprising computer readable program code configured to perform:
- the analyzing the at least portions of the processed data to determine whether the processed data is within the second set of parameters; and
- the generating the second set of processor settings in response to determining the processed data is not within the second set of parameters.

30. The computer program product as recited in claim 21, farther comprising computer readable program code configured as a first analytic engine, the first analytic engine comprising computer readable program code configured to perform:
- the analyzing the at least portions of the received data to determine whether the received data is within the first set of parameters;
- the generating the first set of processor settings in response to determining the received data is not within the first set of parameters; and
- the reprocessing; and
- wherein a second analytic engine is used to perform:
  - the analyzing the at least portions of the processed data to determine whether the processed data is within the second set of parameters; and
  - the generating the second set of processor settings in response to determining the processed data is not within the second set of parameters.

31. The computer program product as recited in claim 21, wherein the computer readable program code configured to process the received data with the first set of processor settings comprises computer readable program code configured to: apply one or more algorithms to the received data, the one or more algorithms being selected from: a detection orientation algorithm, a detect bleed-through algorithm, a background smoothing algorithm, and a detection of page boundaries algorithm.

* * * * *

UNITED STATES PATENT AND TRADEMARK OFFICE
CERTIFICATE OF CORRECTION

| | | |
|---|---|---|
| PATENT NO. | : 9,129,210 B2 | Page 1 of 1 |
| APPLICATION NO. | : 14/266671 | |
| DATED | : September 8, 2015 | |
| INVENTOR(S) | : Roland G. Borrey et al. | |

It is certified that error appears in the above-identified patent and that said Letters Patent is hereby corrected as shown below:

In the Claims:

col. 25, line 34, claim 7, replace "data bend" with --data band--.

Signed and Sealed this
Twenty-third Day of February, 2016

Michelle K. Lee
*Director of the United States Patent and Trademark Office*